(12) United States Patent
Shinohara

(10) Patent No.: US 10,965,849 B2
(45) Date of Patent: Mar. 30, 2021

(54) OPTICAL ELEMENT AND IMAGE PICKUP APPARATUS

(71) Applicant: CANON KABUSHIKI KAISHA, Tokyo (JP)

(72) Inventor: Atsushi Shinohara, Inashiki-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/295,261

(22) Filed: Mar. 7, 2019

(65) Prior Publication Data

US 2019/0306387 A1     Oct. 3, 2019

(30) Foreign Application Priority Data

Apr. 3, 2018   (JP) .............................. JP2018-071410

(51) Int. Cl.
   *H04N 5/225*    (2006.01)
   *G02B 1/10*     (2015.01)
   *B29D 11/00*    (2006.01)
   *H04N 13/204*   (2018.01)

(52) U.S. Cl.
   CPC ..... *H04N 5/2254* (2013.01); *B29D 11/00865* (2013.01); *G02B 1/10* (2013.01); *H04N 13/204* (2018.05)

(58) Field of Classification Search
   CPC .. H04N 5/2254; H04N 13/204; H04N 13/239; H04N 2213/001; B29D 11/00865; G02B 1/10; G02B 17/0642; G02B 7/181; B60W 2420/403; B60W 2420/42; B60Y 2400/3015; B60R 2001/1253; B60R 11/04
   See application file for complete search history.

(56) References Cited

U.S. PATENT DOCUMENTS

| | | | | |
|---|---|---|---|---|
| 5,864,434 A | * | 1/1999 | Taylor ...................... | G02B 5/08 359/883 |
| 2003/0016458 A1 | * | 1/2003 | Richard .................. | B32B 27/08 359/883 |
| 2003/0020886 A1 | * | 1/2003 | Sunaga .................... | G02B 5/09 353/78 |
| 2016/0224848 A1 | * | 8/2016 | Oh ........................ | H04N 5/2257 |

FOREIGN PATENT DOCUMENTS

JP    2017-044722 A    3/2017

* cited by examiner

*Primary Examiner* — Abdelaaziz Tissire
(74) *Attorney, Agent, or Firm* — Venable LLP

(57) ABSTRACT

An optical element includes a substrate, a first resin portion provided on a first main surface of the substrate and having a linear expansion coefficient larger than a linear expansion coefficient of the substrate, a reflection portion provided on the first resin portion, and a second resin portion provided on a second main surface of the substrate opposite to the first main surface and having a linear expansion coefficient larger than the linear expansion coefficient of the substrate.

18 Claims, 14 Drawing Sheets

OPTICAL ELEMENT AND IMAGE PICKUP APPARATUS

BACKGROUND OF THE INVENTION

Field of the Invention

The present invention relates to an optical element including a reflection portion and to an image pickup apparatus including the optical element.

Description of the Related Art

For a moving body such as a vehicle, a technique of disposing an image pickup apparatus in the vehicle to measure a distance to an object outside the vehicle and utilizing the measurement result for automatic driving or driving assistance has been developed. As an image pickup apparatus of this kind, Japanese Patent Laid-Open No. 2017-44722 discloses a camera including a stereo-image pickup optical system. The stereo-image pickup optical system disclosed in Japanese Patent Laid-Open No. 2017-44722 is constituted by forming a plurality of reflection surfaces on the surface of a lens-barrel member.

For an image pickup apparatus such as a surveillance camera or a car-mounted camera, a captured image having a higher precision than conventional image pickup apparatuses is demanded. Therefore, a high shape precision is demanded for a reflection surface used for an image pickup apparatus to obtain a highly-precise captured image. Particularly, in the case where the image pickup apparatus is mounted on a vehicle or installed outdoors, the image pickup apparatus is exposed to temperature change, and therefore a high shape precision is demanded for the reflection surface used for the image pickup apparatus also in a tough temperature environment.

SUMMARY OF THE INVENTION

According to a first aspect of the present invention, an optical element includes a substrate, a first resin portion provided on a first main surface of the substrate and having a linear expansion coefficient larger than a linear expansion coefficient of the substrate, a reflection portion provided on the first resin portion, and a second resin portion provided on a second main surface of the substrate opposite to the first main surface and having a linear expansion coefficient larger than the linear expansion coefficient of the substrate.

According to a second aspect of the present invention, a manufacturing method for an optical element, the manufacturing method includes forming, on a first main surface of a substrate, a first resin portion having a linear expansion coefficient larger than a linear expansion coefficient of the substrate, forming, on a second main surface of the substrate opposite to the first main surface, a second resin portion having a linear expansion coefficient larger than the linear expansion coefficient of the substrate, forming a reflection portion on the first resin portion.

Further features of the present invention will become apparent from the following description of exemplary embodiments with reference to the attached drawings.

DESCRIPTION OF THE EMBODIMENTS

Exemplary embodiments of the present invention will be described in detail below with reference to drawings.

First Exemplary Embodiment

A stereo camera apparatus serving as an example of an image pickup apparatus will be described below. The stereo camera apparatus includes a wide-angle stereo-image pickup optical system, and is a surveillance camera or a car-mounted camera used for measuring a distance to an object, a three-dimensional shape-obtaining camera used for measuring a shape of an object, or the like. Description will be given below by taking a case where the stereo camera apparatus is a car-mounted camera as an example.

Figure 1:
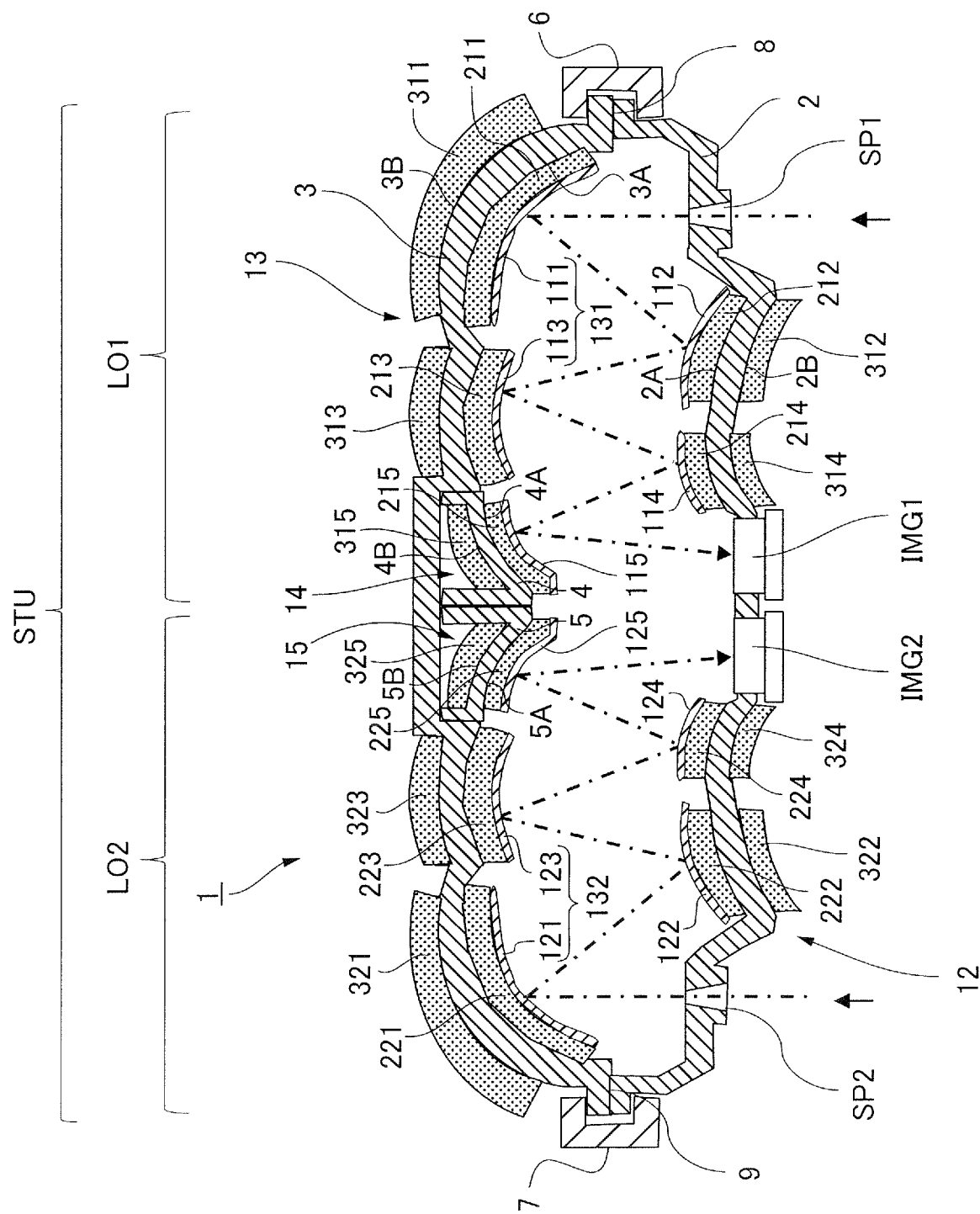
FIG. 1 is a schematic section view of a stereo camera body of a first exemplary embodiment.

FIG. 1 is a schematic section view of a stereo camera body of the stereo camera apparatus according to the first exemplary embodiment. A stereo camera body 1 illustrated in FIG. 1 includes a plurality of optical elements 12, 13, 14, and 15. Each of the optical elements 12 to 15 is a mirror element including a metal substrate and a reflection portion constituted by a light-reflecting member. The optical elements 12 to 15 constitute a stereo-image pickup optical system STU. The stereo-image pickup optical system STU includes an imaging optical system LO1 serving as a first imaging optical system and an imaging optical system LO2 serving as a second imaging optical system. In FIG. 1, the imaging optical system LO1 is on the right, and the imaging optical system LO2 is on the left.

The imaging optical system LO1 includes an opening portion SP1 serving as a first opening portion for taking in external light, and reflection portions 111, 112, 113, 114, and 115 serving as first reflection portions. The imaging optical system LO2 includes an opening portion SP2 serving as a second opening portion for taking in external light, and reflection portions 121, 122, 123, 124, and 125 serving as second reflection portions. The reflection portions 111 to 115 and 121 to 125 are each formed as a free-form surface mirror. The opening portions SP1 and SP2 may be used as apertures of the imaging optical systems LO1 and LO2.

In FIG. 1, reference axes, that is, central principal rays of the imaging optical systems LO1 and LO2 are indicated by one-dot chain lines. Two off-axial optical systems having reference axes bent by a plurality of tilted reflection portions are formed. To be noted, it is preferable that the imaging optical systems LO1 and LO2 are configured to be symmetrical to each other in the left-right direction. This is because, in the case where the field angles of the left and right optical systems are different, the range in which a distance can be measured by stereo measurement is determined by the imaging optical system having the smaller field angle. In addition, this is because there is a risk that the accuracy of the distance measurement decreases when there is a difference in an F number or a focal length between the two optical systems.

The optical element 12 includes a metal frame 2 serving as a first frame that is an example of a substrate. The optical element 13 includes a metal frame 3 serving as a second frame that is an example of a substrate. The optical element 14 includes a metal support base 4 serving as an example of a substrate. The optical element 15 includes a metal support base 5 serving as an example of a substrate. The metal frames 2 and 3 and the support bases 4 and 5 are manufactured by a technique such as a cutting method, a die casting molding method, a press molding method, or a thixomolding method. A material having a good thermal conductivity is preferably used as a metal material thereof, and the metal material may be, for example, an alloy. Using a light metal such as an aluminum alloy or a magnesium alloy has a merit that the metal frames and the support bases that are light and highly rigid can be manufactured at low costs. Further, using a magnesium alloy enables manufacturing a metal substrate with a higher precision by the thixomolding method.

The imaging optical systems LO1 and LO2 are mounted on the metal frames 2 and 3 and the support bases 4 and 5 as follows. The opening portion SP1 serving as an aperture surface for taking external light into the imaging optical system LO1 and the reflection portions 112 and 114 constituting part of the imaging optical system LO1 are provided on the metal frame 2. In addition, the opening portion SP2 serving as an aperture surface for taking external light into the imaging optical system LO2 and the reflection portions 122 and 124 constituting part of the imaging optical system LO2 are provided on the metal frame 2. Further, on the metal frame 2, an image sensor IMG1 serving as an image pickup element is fixed to a position corresponding to an image plane of the imaging optical system LO1, and an image sensor IMG2 serving as an image pickup element is fixed to a position corresponding to an image plane of the imaging optical system LO2. To be noted, although an image pickup portion is constituted by the pair of image sensors IMG1 and IMG2 in the present exemplary embodiment, the configuration is not limited to this. For example, the image pickup portion may be constituted by one image sensor, and the imaging planes of the imaging optical systems LO1 and LO2 may be respectively positioned in two regions on the right and on the left of the image sensor.

As the image sensors IMG1 and IMG2, for example, image pickup elements having sensitivity to visible light having a wavelength of 380 nm to 700 nm such as complementary metal-oxide-semiconductor: CMOS image sensors or charge-coupled device: CCD image sensors are used. However, it is further preferable that the image sensors are capable of receiving and converting, into an electric signal, light of a wavelength range different from visible light, for example, a near-infrared region near 1000 nm, in addition to the visible light. In the case of an image optical system in which optical surfaces having refractive power that is an optical power are constituted only by reflection portions as in the present exemplary embodiment, since there is no color aberration, high imaging performance can be maintained in a wider wavelength range than an imaging optical system constituted by a refractive optical system. Therefore, in the case where the receivable wavelength range of the image pickup element is wide, information of light other than visible light can be also obtained simultaneously. Therefore, this is preferable because the size of the entire system can be reduced as compared with a camera system additionally provided with an infrared camera apparatus.

The reflection portions 111 and 113 constituting part of the imaging optical systems LO1 and reflection portions 121 and 123 constituting part of the imaging optical systems LO2 are provided on the metal frame 3. The support bases 4 and 5 are provided on the metal frame 3, and the positions and orientations thereof can be individually adjusted. The final reflection portion 115 of the imaging optical system LO1 is provided on the support base 4, and the final reflection portion 125 of the imaging optical system LO2 is provided on the support base 5. The reflection portions 115 and 125 are supported such that the positions and orientations thereof can be adjusted via the support bases 4 and 5 so as to appropriately form images on the image pickup surfaces of the image sensors IMG1 and IMG2.

The metal frames 2 and 3 are aligned, are fixed to each other by fixing members 6 and 7 nipping both ends thereof in a longitudinal direction, and thus form a unit, that is, are unitized. The metal frames 2 and 3 are aligned and fixed such that the reflection portions provided on the two metal frames oppose each other to constitute two off-axial optical systems on the left and on the right. The plurality of reflection portions constituting the imaging optical systems LO1 and LO2 have rotationally-asymmetric curvature, and are tilted and disposed to oppose each other such that the reference axes are bent. As a result of including such reflection portions, aberration correction can be facilitated, and the imaging performance can be improved. In the present exemplary embodiment, since the reflection portions and aperture surfaces of the left and right imaging optical systems are integrally provided on the same metal frames, the positions of the two imaging optical systems do not have to be adjusted at the time of assembly.

The metal frames 2 and 3 are in contact with each other highly thermally conductively at both end portions thereof such that there is no big temperature difference therebetween. That is, the metal frames 2 and 3 are fixed to each other via the fixing members 6 and 7 such that a plurality of thermal conduction paths having good thermal conductivity are formed by the direct contact between the metal frames 2 and 3. In FIG. 1, the metal frames 2 and 3 are in contact with each other at contact portions 8 and 9, and thus two thermal conduction paths having good thermal conductivity are formed.

It is preferable that parts of the metal frames 2 and 3 that come into contact with each other are subjected to mirror finishing or the like to increase the flatness of the surfaces thereof such that the contact area at the contact portions 8 and 9 is sufficiently large. In addition, in the case of bringing rough surfaces having low flatness into contact with each other, the total area of the contact portions 8 and 9 are set to be large such that substantially enough contact area can be secured. That is, sufficiently large thermal conductance can be secured between the metal frames 2 and 3 by providing contact portions large enough to secure necessary contact area in terms of total area in consideration of the flatness.

Figure 2:
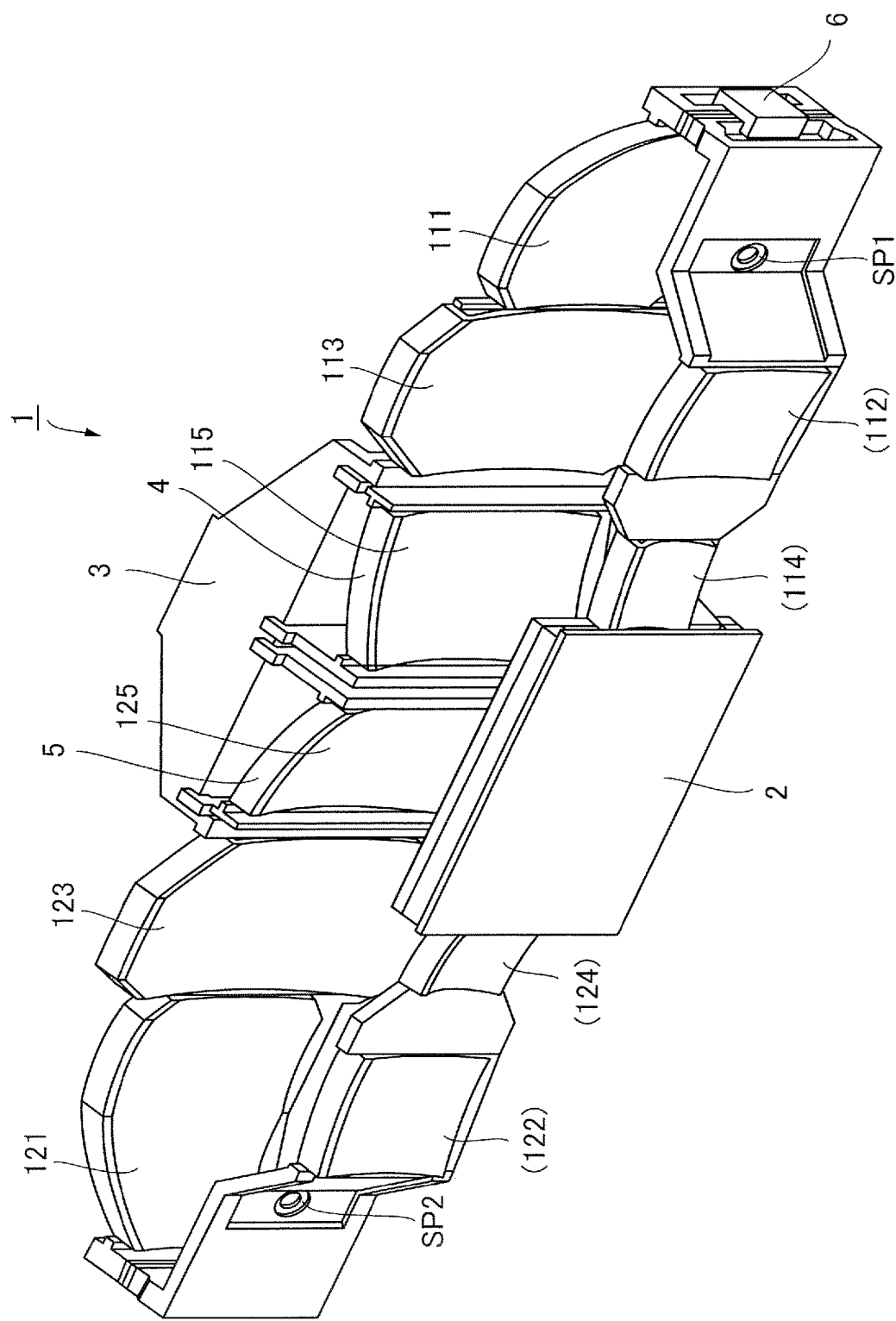
FIG. 2 is an external perspective view of the stereo camera body of the first exemplary embodiment.
Figure 3:
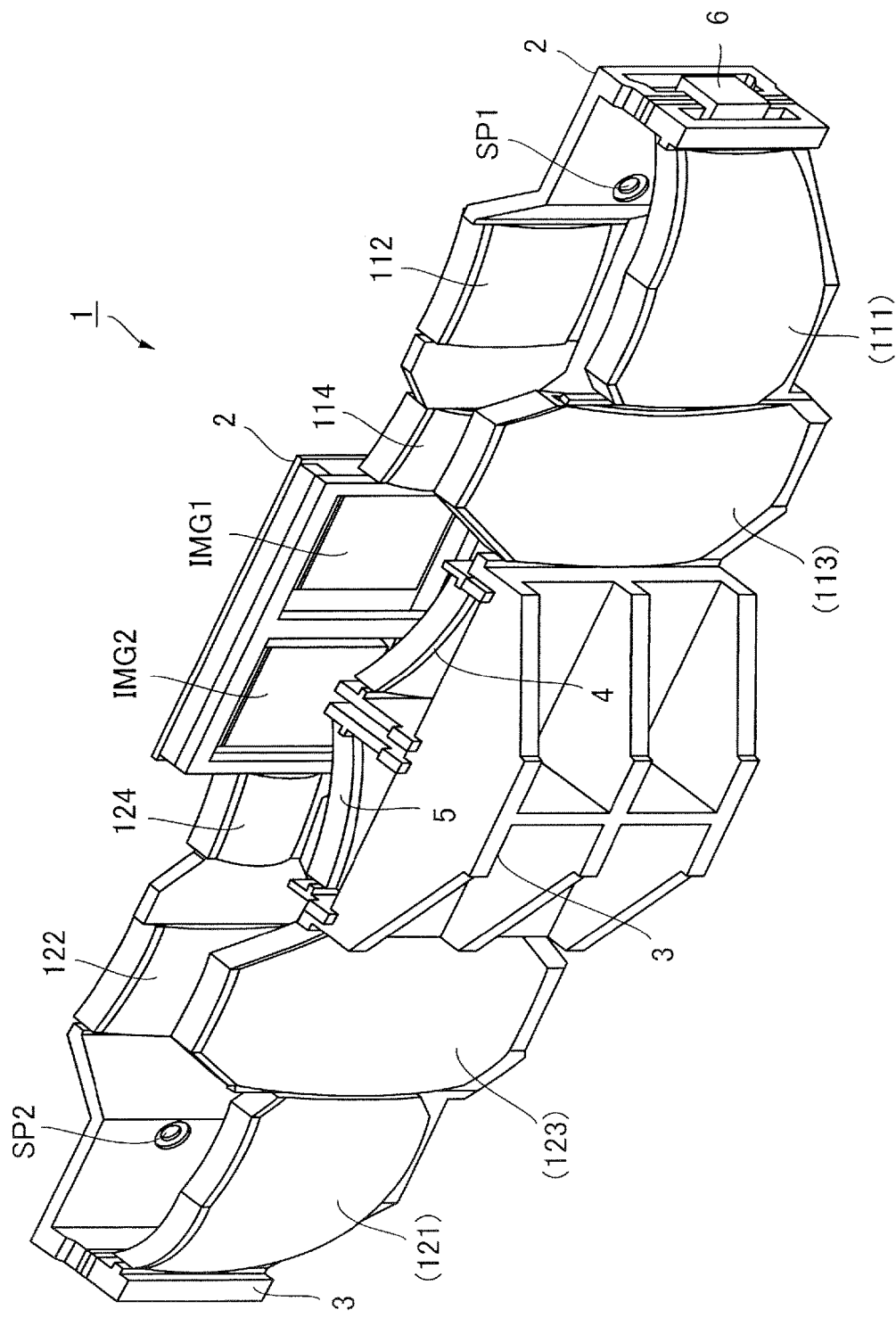
FIG. 3 is an external perspective view of the stereo camera body of the first exemplary embodiment.

To facilitate understanding the structure of the stereo camera body 1, FIGS. 2 and 3 illustrate external perspective views of the stereo camera body 1. FIG. 2 is a perspective view as viewed in such an angle that odd-numbered reflection portions can be seen, and FIG. 3 is a perspective view as viewed in such an angle that even-numbered reflection portions and imaging surfaces of the image sensors can be seen. To be noted, although the even-numbered reflection portions in FIG. 2 and the odd-numbered reflection portions in FIG. 3 are at positioned that cannot be seen directly, reference numerals of the unseen reflection portions are shown with parentheses at positions on the metal frame opposite to the unseen reflection portions.

In the present exemplary embodiment, the metal frames 2 and 3 are metal members extending in the longitudinal direction. The longitudinal direction of the metal frames 2 and 3 correspond to the left-right direction, and the transverse direction of the metal frames 2 and 3 correspond to the up-down direction. Therefore, the imaging optical system LO1 is disposed on one side of the metal frames 2 and 3 in the longitudinal direction, and the imaging optical system LO2 symmetrically disposed with respect to the imaging optical system LO1 is disposed on the other side of the metal frames 2 and 3 in the longitudinal direction.

Next, the reflection portions provided on the metal frames 2 and 3 and the support bases 4 and 5 of the present exemplary embodiment will be described. Although base materials of the metal frames and the metal support bases can be used as the reflection portions, a fine working technique is required for forming reflection portions having rotationally asymmetrical curvature and high reflectivity, which is not practical in terms of costs because mass production cannot be expected therefrom.

Therefore, in the present exemplary embodiment, as illustrated in FIG. 1, resin portions 212, 214, 222, and 224 serving as a plurality of first resin portions having high shape precision are formed on a main surface 2A serving as a first main surface of the metal frame 2. Further, the reflection portions 112, 114, 122, and 124 constituted by reflective films formed from metal are respectively formed on the resin portions 212, 214, 222, and 224 serving as first resin portions. In addition, resin portions 211, 213, 221, and 223 serving as a plurality of first resin portions having high shape precision are formed on a main surface 3A serving as a first main surface of the metal frame 3. Further, the reflection portions 111, 113, 121, and 123 constituted by reflective films formed from metal are respectively formed on the resin portions 211, 213, 221, and 223. In addition, a resin portion 215 serving as one first resin portion having high shape precision is formed on a main surface 4A serving as a first main surface of the support base 4. Further, the reflection portion 115 constituted by a reflective film formed from metal is formed on the resin portion 215. In addition, a resin portion 225 serving as one first resin portion having high shape precision is formed on a main surface 5A serving as a first main surface of the support base 5. Further, the reflection portion 125 constituted by a reflective film formed from metal is formed on the resin portion 225. As a result of this, even when the ambient temperature changes as a result of, for example, cold wind from a car air conditioner hitting the optical elements and the optical elements being quickly cooled from a high-temperature state caused by being parked in a hot weather, the temperatures of the optical elements can be equalized by the metal frames 2 and 3 and the metal support bases 4 and 5 having good thermal conductivity. This enables maintaining high imaging performance.

The thicknesses of the metal frames 2 and 3 and the support bases 4 and 5 that are metal substrates are preferably 0.3 mm to 3 mm. This is because the heat capacity of the substrates is small and therefore the effect of equalizing the temperature is small in the case where the thicknesses of the substrate are smaller than 0.3 mm. In addition, this is because the total weight of the optical elements is large in the case where the thicknesses of the substrates are larger than 3 mm. Further, this is because, in the case where the substrates are manufactured by a highly productive processing method such as a thixomolding method or a die casting molding method, the shape precision of the manufactured substrates is lower when the thicknesses of the substrates are larger than 3 mm than when the thicknesses of the substrates are equal to or smaller than 3 mm.

The resin portions 211 to 215 and 221 to 225 are respectively formed in substantially equal thicknesses on metal substrates formed in shapes corresponding to the shapes of the respective mirrors. The variation of the thicknesses of the resin portions is preferably equal to or smaller than 0.2 mm. To be noted, the thickness of a resin portion is a dimension of the resin portion in a normal direction of the main surface of the substrate.

In addition, the thicknesses of the resin portions 211 to 215 and 221 to 225 are each preferably 0.3 mm to 2 mm. In the case where the thickness of each resin portion is smaller than 0.3 mm, sometimes there is a difference in shape precision between the gate side and the opposite side to the gate because the flow resistance of molten resin at the time of injection molding increases and the resin needs to be injected at high speed and high pressure. In addition, since resin has lower thermal conductivity than metal, the effect of equalizing the temperature of optical elements by using the metal substrates is small when the thickness of each resin portion is larger than 2 mm.

Parts of the main surface 3A of the metal frame 3, the main surface 4A of the support base 4, and the main surface 5A of the support base 5 on which the first resin portions are provided are formed in curved surfaces having shapes corresponding to the shapes of the reflection portions. In the present exemplary embodiment, the parts are formed in concave surfaces. Parts of the main surface 2A of the metal frame 2 on which first resin portions are provided are formed in curved surfaces having shapes corresponding to the shapes of the reflection portions, which are convex surfaces in the present exemplary embodiment. The main surfaces 2A, 3A, 4A, and 5A are preferably formed as surfaces of high shape precision. However, these surfaces do not necessarily have to be formed with high shape precision. For example, these surfaces may be rough surfaces. Surfaces of the resin portions 211 to 215 and 221 to 225 serving as first resin portions are formed as curved surfaces having rotationally asymmetrical curvature with high precision by a method such as transfer of a mold surface. The reflection portions 111 to 115 and 121 to 125 constituted by reflective films are formed on the highly precise curved surfaces by a method such as vapor deposition of metal. The surfaces of the reflection portions serve as reflection surfaces.

In the present exemplary embodiment, as illustrated in FIG. 1, the reflection portions 111 to 115 and 121 to 125 are individually provided on the respective resin portions 211 to 215 and 221 to 225. That is, one reflection portion is provided on one first resin portion.

Description will be given below by taking the optical element 13 as an example. A plurality of first resin portions are provided on the main surface 3A of the metal frame 3. Specifically, a plurality of first resin portions corresponding to the imaging optical system LO1 and a plurality of first resin portions corresponding to the imaging optical system LO2 are provided on the main surface 3A. One reflection portion constituting part of the imaging optical system LO1 is provided on each of the resin portions 211 and 213, and one reflection portion constituting part of the imaging optical system LO2 is provided on each of the resin portions 221 and 223. A reflection portion group 131 of the imaging optical system LO1 constituted by the reflection portions 111 and 113 provided on the resin portions 211 and 213 and a reflection portion group 132 of the imaging optical system LO2 constituted by the reflection portions 121 and 123 provided on the resin portions 221 and 223 are disposed symmetrically in the left-right direction. As described above, the optical element 13 includes the pair of reflection portion groups 131 and 132 that are symmetrical in the left-right direction, and thus constitutes part of the stereo-image pickup optical system STU. The same applies to the optical element 12.

Resin constituting the resin portions 211 to 215 and 221 to 225 can be selected from thermosetting resin, thermoplastic resin, and ultraviolet curable resin in consideration of moldability, durability, and other factors. The resin does not have to be transparent, but is preferably an amorphous optical resin to enhance the functionality as a mirror. For example, polycarbonate resin, acrylic resin, methyl methacrylate-styrene resin: MS resin, polyolefin-based resin, and the like can be used. In particular, since polyolefin-based resin has low hygroscopicity, polyolefin-based resin can suppress deformation of the reflection portions caused by moisture absorption of the resin, and thus can provide a reflective optical unit that realizes high distance measurement precision without being affected by the humidity of the environment in which the unit is used. Specific examples of the polyolefin-based resin to be used include ZEONEX (registered trademark) manufactured by Zeon Corporation. In addition, the resin does not have to be constituted by a single material, and resin in which inorganic fine particles or the like are dispersed to improve the properties as a material or impart functionality can be also used. In addition, the resin portions may be constituted by a plurality of layers of different materials.

Considering manufacturing methods of the resin portions and the reflection portions, it is difficult to form all the reflection portions of the two imaging optical systems on a single metal frame. Therefore, in the present exemplary embodiment, the reflection portions are disposed on the two metal frames 2 and 3 and the two support bases 4 and 5. Specifically, the two imaging optical systems LO1 and LO2 are formed by combining the plurality of optical elements 12 to 15.

Figure 4:
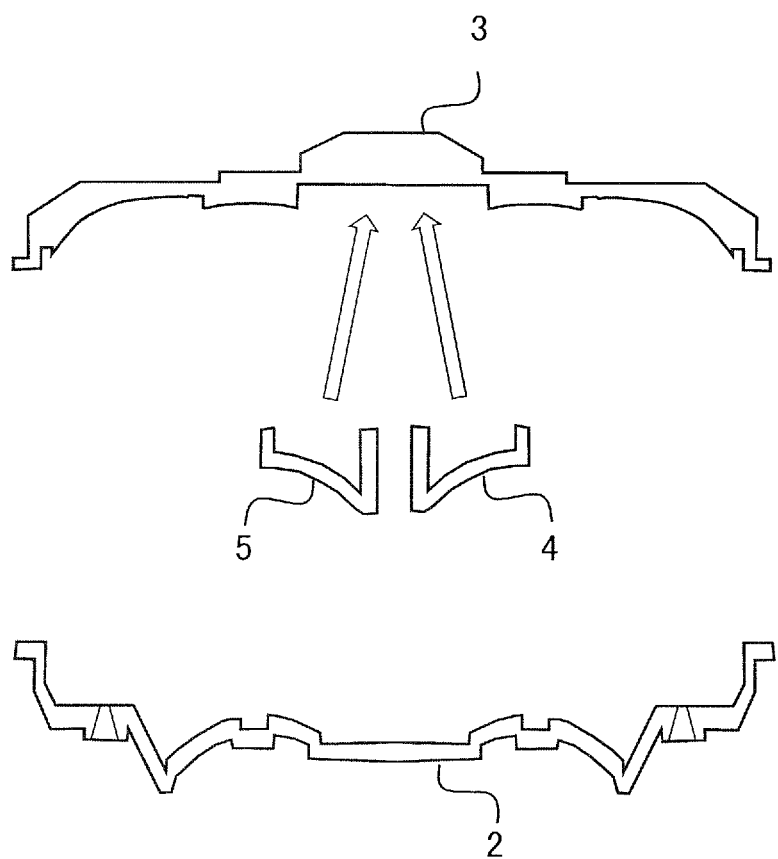
FIG. 4 is a diagram illustrating a configuration of a metal frame of the stereo camera body of the first exemplary embodiment.

More specifically, as illustrated in FIG. 4, the metal frame 2 on which the even-numbered reflection portions as counted from the incident side are formed and the metal frame 3 on which the odd-numbered reflection portions as counted from the incident side are formed are formed as separate frames. Further, the support bases 4 and 5 on which the final reflection portions are formed are provided on the metal frame 3. To be noted, in the case where the alignment between the imaging optical systems and the image sensors does not have to be adjusted by the positions and orientations of the final reflection portions, the final reflection portions may be also formed on the metal frames 3. As a result of employing the configuration in which the even-numbered reflection portions and the odd-numbered reflection portions facing each other are respectively provided on one sides of different frames, formation of the resin portions and reflective films can be performed with high precision and at low cost by using general manufacturing techniques such as insert molding and vapor deposition.

A stereo camera apparatus including the stereo camera body 1 will be described. The stereo camera apparatus includes a casing for protecting the stereo camera body 1 to prevent unwanted external light or foreign matter from getting into the stereo camera body 1 or to prevent external objects from coming into direct contact with the stereo camera body 1. In the present exemplary embodiment, the stereo camera body 1 is installed in a casing having a double-layer structure to enhance the protection performance and suppress influence of heating and cooling from external environments on the stereo camera body 1.

Figure 5:
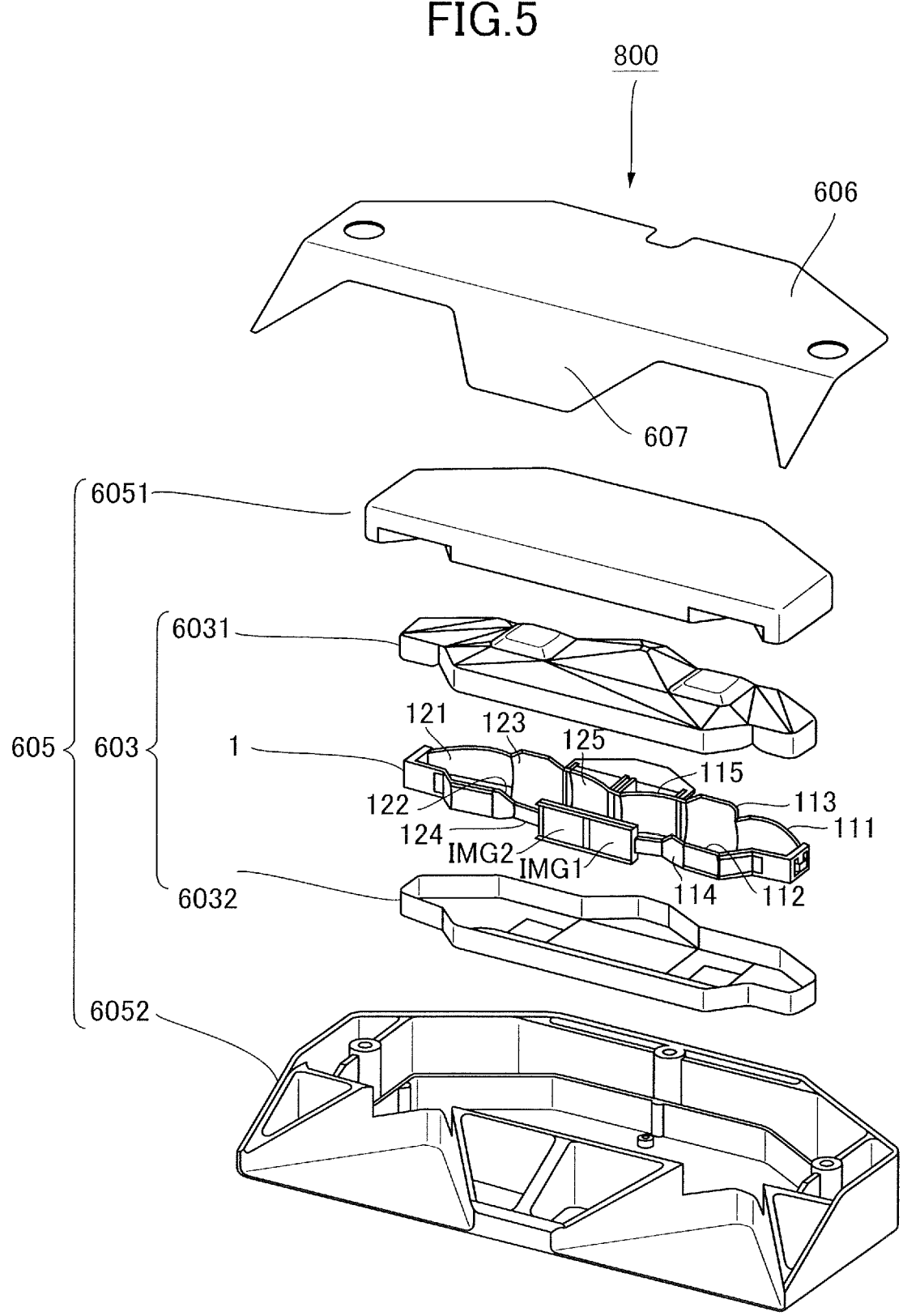
FIG. 5 is a diagram illustrating a specific configuration of a casing having a double-layer structure of the first exemplary embodiment.

FIG. 5 illustrates a specific configuration of casings 603 and 605 constituting the double-layer structure included in a stereo camera apparatus 800 of the present exemplary embodiment. As illustrated, an inner casing 603 includes an inner casing upper member 6031 and an inner casing lower member 6032. The stereo camera body 1 is sandwiched by the inner casing upper member 6031 and the inner casing lower member 6032 and is thus supported. In addition, an outer casing 605 includes an outer casing upper member 6051 and an outer casing lower member 6052, and supports the inner casing 603 by sandwiching the inner casing 603 between the outer casing upper member 6051 and the outer casing lower member 6052.

An attachment member 606 for mounting the stereo camera apparatus 800 on a windshield of a vehicle or the like is coupled to an upper portion of the outer casing 605. The shape of an inclined surface 607 of the attachment member 606 is adjusted such that the attachment member 606 can be in firm contact with the windshield on which the stereo camera apparatus 800 is to be mounted.

Figure 6:
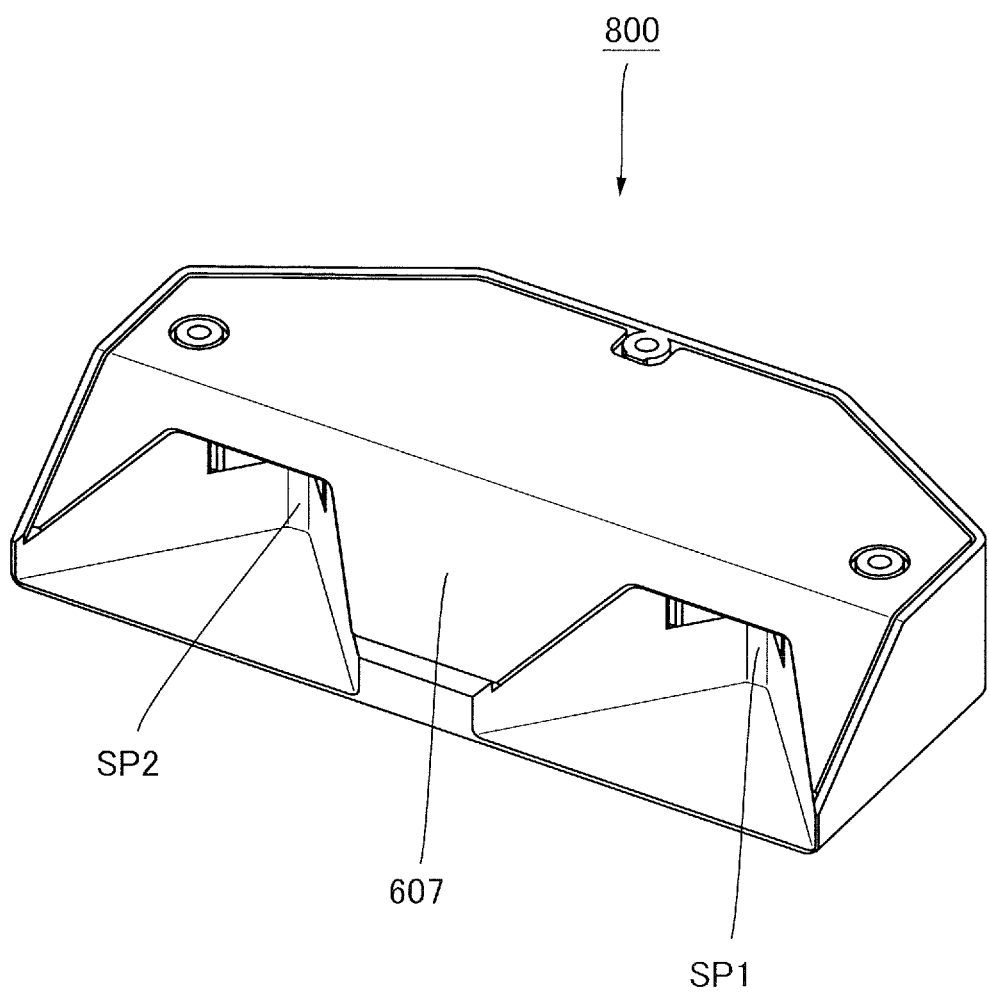
FIG. 6 is an external perspective view of a stereo camera apparatus of the first exemplary embodiment.

FIG. 6 is an external perspective view of the stereo camera apparatus 800. As illustrated, openings expanding outwardly are provided on the front surface side of the inner casing 603, the outer casing 605, and the attachment member 606 such that external light of a predetermined field angle is incident on the opening portions SP1 and SP2 of the stereo camera body.

Figure 7A:
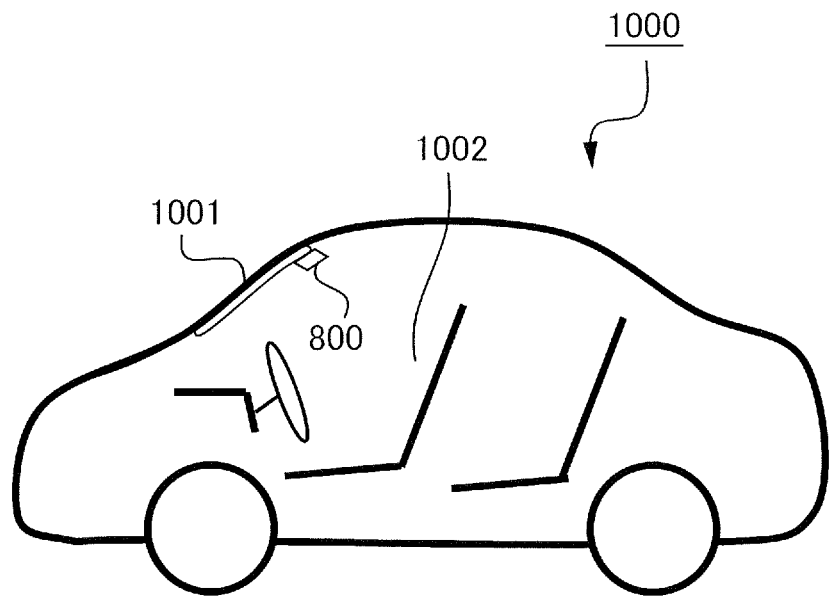
FIG. 7A illustrates a sealed vehicle incorporating the stereo camera apparatus of the first exemplary embodiment.
Figure 7B:
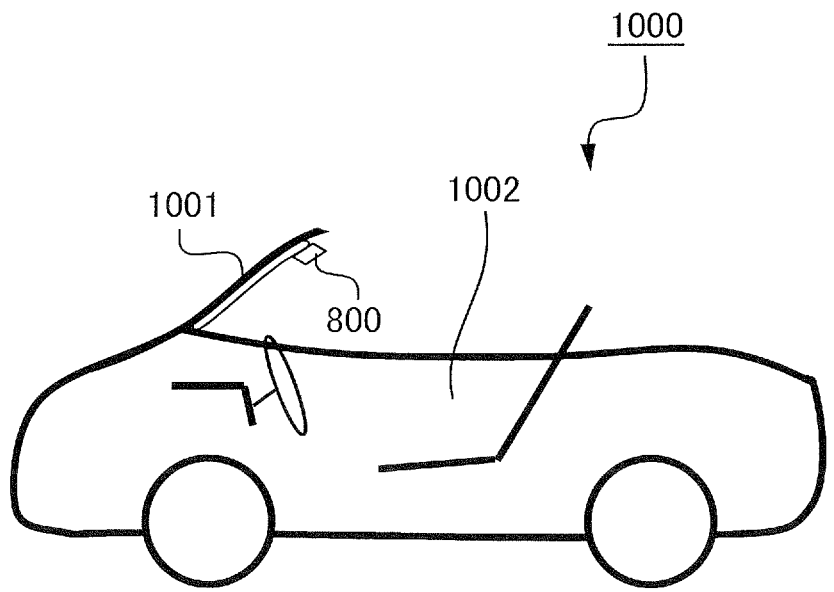
FIG. 7B is an opened vehicle incorporating the stereo camera apparatus of the first exemplary embodiment.

FIGS. 7A and 7B illustrate examples of a vehicle mounting the stereo camera apparatus 800. In these figures, a vehicle 1000 includes a windshield 1001 and a seat 1002. As illustrated in FIGS. 7A and 7B, the stereo camera apparatus 800 is provided on the seat 1002 side of the windshield 1001 that is a glass window, specifically in the vicinity of an upper edge portion of the windshield 1001.

The stereo camera 800 of the present exemplary embodiment can be suitably mounted on a windshield regardless of whether the vehicle is a vehicle in which the seat is sealed as exemplified in FIG. 7A or a vehicle in which the upside of the seat is exposed as exemplified in FIG. 7B.

To be noted, in the case where it is necessary to measure a distance to another vehicle driving behind or a distance to an object at the time of backing up the vehicle for upgrading automatic driving or driving assistance, the stereo camera apparatus 800 may be also mounted on the seat side of a glass window on the rear side. Also in this case, the stereo camera apparatus of the present exemplary embodiment is capable of obtaining a highly reliable measurement result because decrease in accuracy of stereo measurement caused by direct sunlight or cold air is suppressed.

To be noted, the number, shapes, and arrangement of free-form surface mirrors constituting each imaging optical system can be changed as appropriate.

Here, it has been found that, in the case where resin portions are provided on only one sides of the substrates, the optical elements are deformed, specifically, the substrates are warped and the reflection portions are deformed, when the temperature of the environment in which the stereo camera apparatus is put changes. Since the substrates and the resin portions have different linear expansion coefficients, it is presumed that the warpage of the substrates is caused by the difference in the linear expansion coefficients, that is, difference in the amount of expansion. More specifically, when the temperature of the environment becomes higher than a normal temperature, the resin portions expand more than the substrates in the case where the linear expansion coefficient of the resin portions is larger than the linear expansion coefficient of the substrates. It is presumed that, as a result of this, the substrates are warped, the resin portions are also warped along with the substrates, and thus the reflection portions are deformed. It is also presumed that, in the case where the temperature of the environment is lower than the normal temperature, the resin portions shrink more than the substrates, and thus the reflection portions are deformed.

Therefore, in the present exemplary embodiment, as illustrated in FIG. 1, resin portions 312, 314, 322, and 324 serving as second resin portions are provided on a main surface 2B serving as a second main surface of the metal frame 2 opposite to the main surface 2A. In addition, resin portions 311, 313, 321, and 323 serving as second resin portions are provided on a main surface 3B serving as a second main surface of the metal frame 3 opposite to the main surface 3A. In addition, a resin portion 315 serving as a second resin portion is provided on a main surface 4B serving as a second main surface of the support base 4 opposite to the main surface 4A. In addition, a resin portion 325 serving as a second resin portion is provided on a main surface 5B serving as a second main surface of the support base 5 opposite to the main surface 5A.

That is, the first resin portions and the second resin portions containing resin of a linear expansion coefficient larger than a linear expansion coefficient of the substrates are provided so as to oppose each other with the substrates therebetween. Taking the resin portions 211 and 311 provided on the metal frame 3 as an example, the resin portions 211 and 311 are provided so as to oppose each other with the metal frame 3 therebetween. In other words, the resin portion 311 is disposed opposite to the resin portion 211 with the metal frame 3 therebetween. Similarly, the resin portions 312 to 315 and 321 to 325 serving as second resin portions are also disposed so as to oppose the resin portions 212 to 215 and 221 to 225 with the metal frames 2 and 3 and the support bases 4 and 5 therebetween.

It has been found that, as a result of providing resin portions on both sides of the metal frames 2 and 3 and the support bases 4 and 5, deformation, or warpage, of the metal frames 2 and 3 and the support bases 4 and 5 is suppressed, and thus deformation of the reflection portions is suppressed, even when the temperature of the environment in which the stereo camera apparatus 800 is put changes. Here, resin constituting the first resin portions and resin constituting the second resin portions may have different compositions. However, the resins preferably are formed by the same resin from the viewpoint of further reducing deformation of the reflection portions.

Presumed effects will be described by focusing on the metal frame 3, the pair of resin portions 211 and 311, and the reflection portion 111. It is considered that, in the case where the temperature of the environment in which the stereo camera apparatus 800 illustrated in FIG. 6, that is, the optical element 13 is put changes, the resin portion 211 illustrated in FIG. 1 expands more than the metal frame 3, and similarly the resin portion 311 also expands more than the metal frame 3. Therefore, it is considered that force of the resin portion 211 to deform the metal frame 3 and force of the resin portion 311 to deform the metal frame 3 cancel each other, the warpage of the metal frame 3 is suppressed as a result, and thus the deformation of the reflection portion 111 is suppressed. The same applies to the other reflection portions 112 to 115 and 121 to 125.

As described above, the pair of resin portions suppress warpage of the metal frames 2 and 3 and the support bases 4 and 5 even when the temperature of the environment changes. Therefore, deformation of the reflection portions 111 to 115 and 121 to 125 is suppressed, and thus the shapes of the reflection surfaces of the reflection portions 111 to 115 and 121 to 125 can be maintained in a state of high precision. As a result of this, the quality of a captured image obtained by the stereo camera apparatus 800 can be kept high.

It is preferable that values obtained by subtracting the thicknesses of the resin portions 311 to 315 and 321 to 325 serving as second resin portions respectively from the thicknesses of the resin portions 211 to 215 and 221 to 225 serving as first resin portions are in the range of −0.2 mm to +0.2 mm. More preferably, the values are in the range of −0.2 mm to +0.05 mm. Although it is preferable that the thickness of a first resin portion is equal to the thickness of a second resin portion from the viewpoint of flow balance when resin flows, there are also variations in the thickness of the substrates. Since the overall thickness of the optical element is kept approximately constant by the mold, it is preferable that the variations of the thickness of the metal substrates are absorbed by the thicknesses of the second resin portions. Therefore, the values are preferably in the range described above.

Figure 8A:
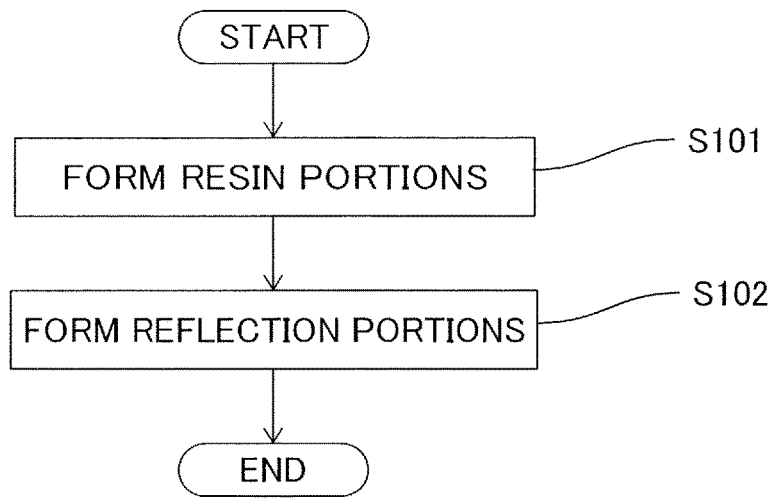
FIG. 8A is a flowchart for describing a manufacture procedure of the first exemplary embodiment.

A manufacturing method for the optical elements will be described below in detail. To be noted, since the same manufacturing method is used for each of the optical elements 12 to 15, the description will be given below by taking the optical element 13 as an example. FIG. 8A is a flowchart for describing a manufacture procedure of the optical element. As illustrated in FIG. 8A, the manufacturing method for the optical element can be roughly divided into step S101 serving as a first formation step and step S102 serving as a second forming step. In step S101, the resin portions 211, 213, 221, and 223 serving as first resin portions and the resin portions 311, 313, 321, and 323 serving as second resin portions are formed on the metal frame 3 serving as a substrate. In step S102, the reflection portions 111, 113, 121, and 123 serving as reflective films are formed on the respective surfaces of the resin portions 211, 213, 221, and 223.

Figure 8B:
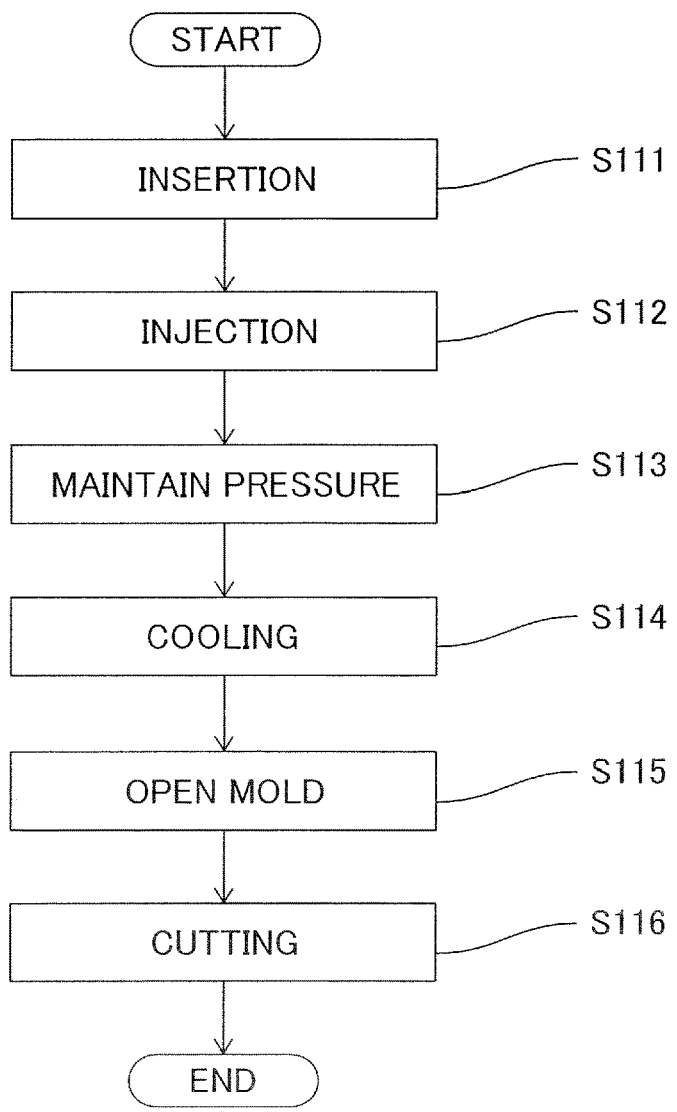
FIG. 8B is a flowchart for describing a process of forming resin portions of the first exemplary embodiment.

In step S101 of forming the resin portions, the resin portions are preferably formed by a molding technique using a mold such as an insert molding method, a thermocompression bonding method, or a replica molding method. By preparing a mold that satisfies a shape precision requirement for the reflection portions in advance, highly precise reflection portions can be formed even when there is an error in the manufacture of the metal substrate by absorbing the influence of the error. In particular, the insert molding method, which is highly productive, is preferable. In the present exemplary embodiment, the resin portions are formed by an insert molding method in step S101. Step S101 will be described below in detail. FIG. 8B is a flowchart for describing a first formation step.

Figure 9A:
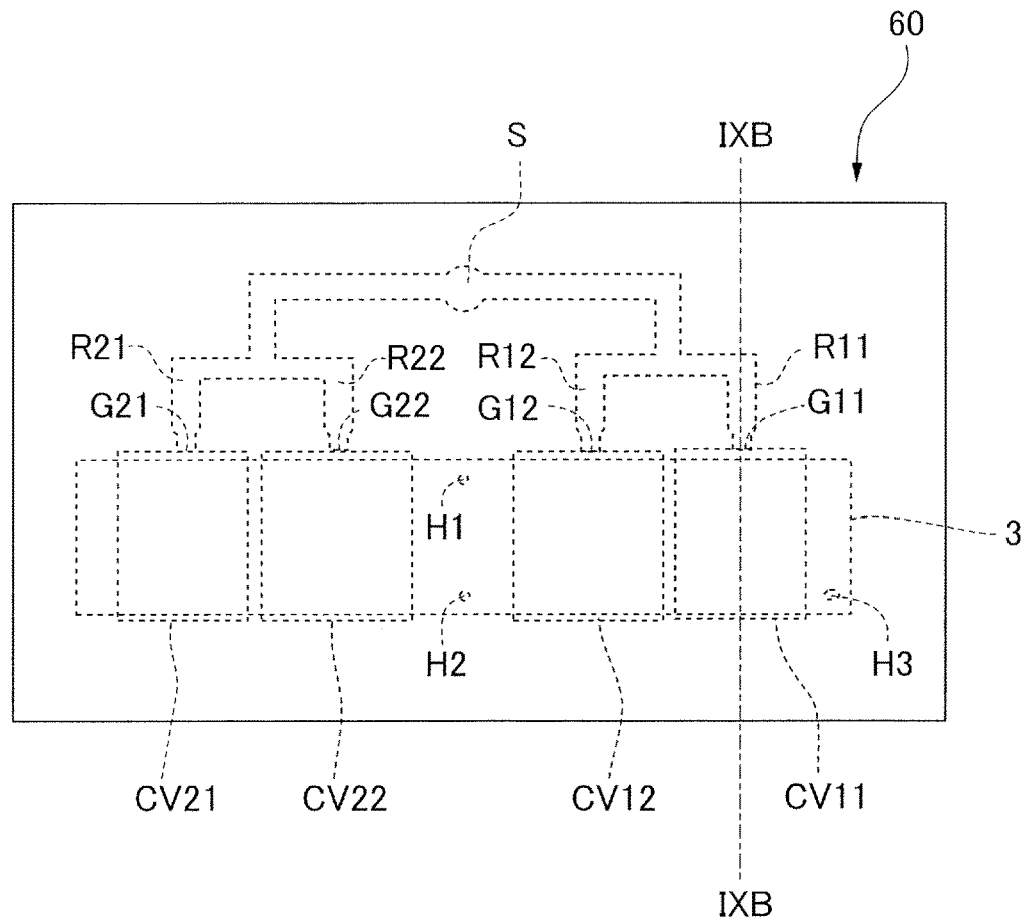
FIG. 9A is a diagram for describing the process of forming the resin portions of the first exemplary embodiment.
Figure 9B:
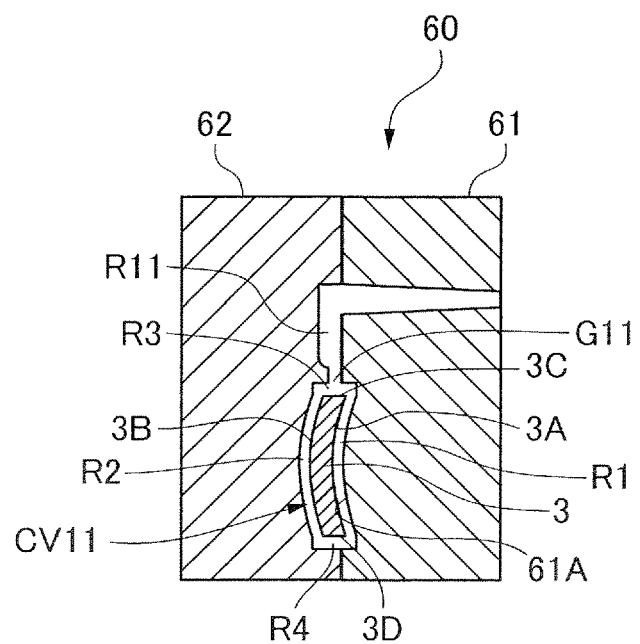
FIG. 9B is a diagram for describing the process of forming the resin portions of the first exemplary embodiment.

First, in step S111 serving as an insertion step illustrated in FIG. 8B, the metal frame 3 prepared in advance is inserted in a mold. FIGS. 9A and 9B are diagrams for describing steps for forming the resin portions of the first exemplary embodiment. FIG. 9A is an explanatory diagram illustrating a state in which the metal frame 3 is inserted in a mold 60. FIG. 9B is a section view of the mold 60 taken along a line DM of FIG. 9A. As illustrated in FIG. 9B, the mold 60 includes a stationary mold 61 and a movable mold 62 that is movable in a mold clamping direction and a mold opening direction with respect to the stationary mold 61.

Step S111 will be described in detail with reference to FIGS. 9A and 9B. First, the metal frame 3 is positioned in the stationary mold 61 or the movable mold 62 in an opened state of the mold 60. For example, unillustrated positioning pins are provided on the stationary mold 61 or the movable mold 62, and the metal frame 3 is positioned with respect to the stationary mold 61 or the movable mold 62 by fitting the positioning pins in holes H1, H2, and H3 of the metal frame 3 illustrated in FIG. 9A. Then, the mold 60 is clamped as illustrated in FIG. 9B. As a result of this, the metal frame 3 is sandwiched between the stationary mold 61 and the movable mold 62, and is thus inserted in the mold 60 in a state of being positioned and held in the mold 60.

By clamping the mold 60, a plurality of cavities CV11, CV12, CV21, and CV22 are defined inside the mold 60 as illustrated in FIG. 9A. The metal frame 3 is disposed to be present in all of the plurality of cavities CV11, CV12, CV21, and CV22 in the mold 60. An inner surface of the stationary mold 61 that defines the cavities CV11, CV12, CV21, and CV22, an inner surface 61A in FIG. 9B, is formed with high precision such that highly-precise free-surface shapes can be transferred to the resin portions serving as bases for the reflection portions.

The cavity CV11 is a space for forming the resin portions 211 and 311 illustrated in FIG. 1. The cavity CV12 is a space for forming the resin portions 213 and 313 illustrated in FIG. 1. The cavity CV21 is a space for forming the resin portions 221 and 321 illustrated in FIG. 1. The cavity CV22 is a space for forming the resin portions 223 and 323 illustrated in FIG. 1.

In the present exemplary embodiment, since the resin portions 211, 213, 221, and 223 illustrated in FIG. 1 serving as bases for reflection portions are formed by the stationary mold 61, the metal frame 3 is highly precisely positioned with respect to the stationary mold 61 by the unillustrated positioning pins formed on the stationary mold 61. Therefore, variations, that is, errors of the thickness of the metal frame 3 are absorbed by the resin portions 311, 313, 321, and 323 illustrated in FIG. 1 formed on the opposite side to the resin portions 211, 213, 221, and 223.

Inside the mold 60, a channel of molten resin constituted by a sprue S, runners R11, R12, R21, and R22, and gates G11, G12, G21, and G22 and communicating with the cavities CV11, CV12, CV21, and CV22 is defined. Each of the cavities CV11, CV12, CV21, and CV22 is independently provided with one gate.

In the present exemplary embodiment, in the cavity CV11, a space R1 serving as a first space is provided between mold 60 and the main surface 3A of the metal frame 3 inserted in the mold 60, and a space R2 serving as a second space is provided between the mold 60 and the main surface 3B.

In the cavity CV11, an end portion 3C serving as a first end portion among a pair of end portions 3C and 3D of the metal frame 3 interconnecting the main surfaces 3A and 3B in a transverse direction corresponding to the up-down direction is separated from the mold 60. By disposing the metal frame 3 in the mold 60 in such a manner, a channel R3 that is a space serving as a first channel of the molten resin through which the space R1 on the main surface 3A side communicates with the space R2 on the main surface 3B side is defined between the end portion 3C and the mold 60. In the present exemplary embodiment, the gate G11 is connected to the channel R3. Since the space R1 communicates with the space R2 through the channel R3 defined by the mold 60 and the end portion 3C of the metal frame 3, a plurality of gates connecting to the cavity CV11 do not have to be provided.

In addition, in the cavity CV11, the end portion 3D serving as a second end portion opposite to the end portion 3C, that is, opposite to the gates, among the pair of end portions 3C and 3D of the metal frame 3 interconnecting the main surfaces 3A and 3B in the transverse direction is separated from the mold 60. By disposing the metal frame 3 in the mold 60 in such a manner, a channel R4 that is a space serving as a second channel of the molten resin through which the space R1 communicates with the space R2 is defined between the end portion 3D and the mold 60.

Figure 10:
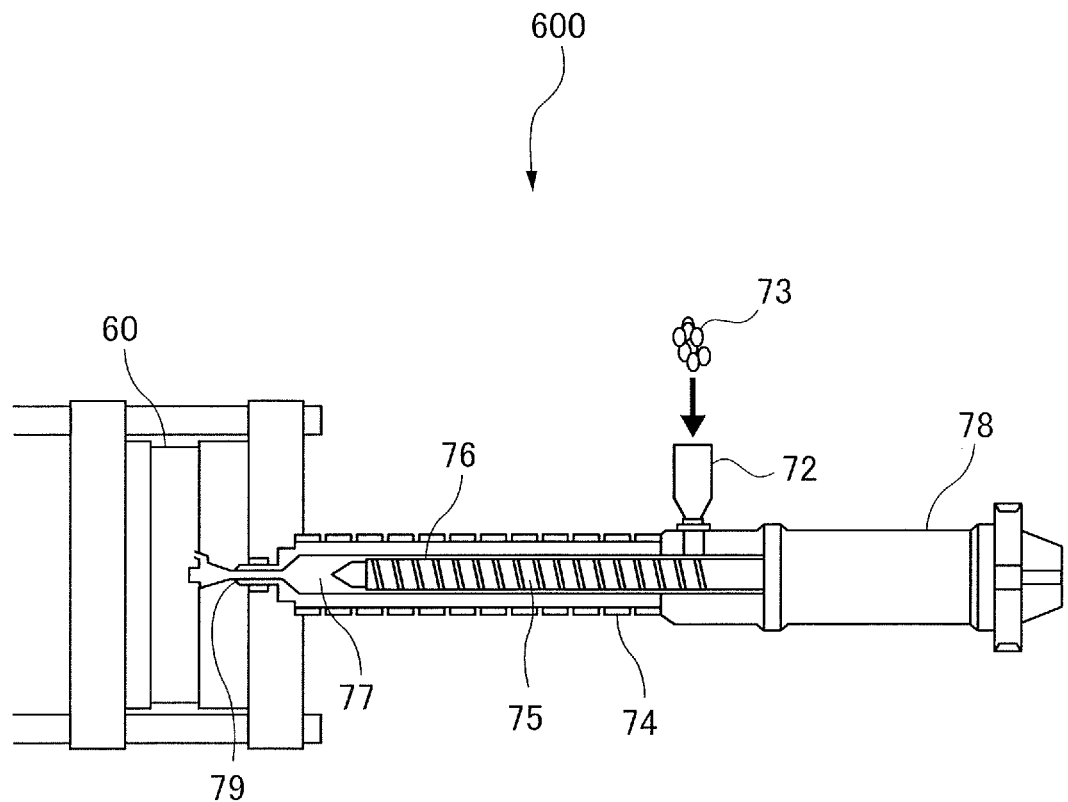
FIG. 10 is a diagram for describing the process of forming the resin portions of the first exemplary embodiment.

FIG. 10 is a diagram for describing a step for forming the resin portions of the first exemplary embodiment. FIG. 10 illustrates an injection molding apparatus 600 for molding the resin portions. In step S112 of FIG. 8B serving as an injection step, molten resin is injected into the cavities CV11, CV12, CV21, and CV22 in the mold 60 by the injection molding apparatus 600. Specifically, pellets of resin 73 are charged into a hopper 72, are liquified by being heated by a heater 74, are pressed by a screw 75, and flow in a cylinder 76 toward a reservoir portion 77. The liquified molten resin reserved in the reservoir portion 77 is injected through a nozzle 79 by an action of a high-speed injection unit 78.

The molten resin is supplied to the cavities CV11, CV12, CV21, and CV22 through the sprue S and respectively through the runners R11, R12, R21, and R22 and the gates G11, G12, G21, and G22 illustrated in FIG. 9A. Taking the cavity CV11 as an example, as illustrated in FIG. 9B, the molten resin that has flowed into the cavity CV11 through the gate G11 branches into the spaces R1 and R2 through the channel R3. In this manner, the molten resin can be simultaneously injected into both the spaces R1 and R2 through the one gate G11. Therefore, pressure applied to the main surface 3A side of the metal frame 3 from the molten resin can be cancelled by pressure applied to the main surface 3B side of the metal frame 3 from the molten resin. As a result of this, variations of pressure distribution and temperature distribution on the metal frame 3 between molding shots can be prevented, and thus the optical element 13 can be manufactured in a highly-reproducible manner. In addition, molten resin that has flowed through the space R1 on the main surface 3A side and molten resin that has flowed through the space R2 on the main surface 3B side join together in the channel R4 that is a space on the side opposite to the gate side, and thus the metal frame 3 is covered by resin. Molten resin is injected into the cavities CV12, CV21, and CV22 in the same manner.

Figure 11A:
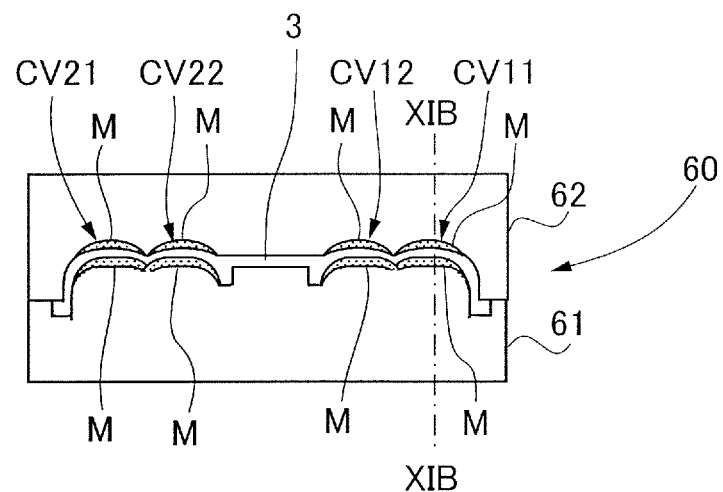
FIG. 11A is a diagram for describing the process of forming the resin portions of the first exemplary embodiment.
Figure 11B:
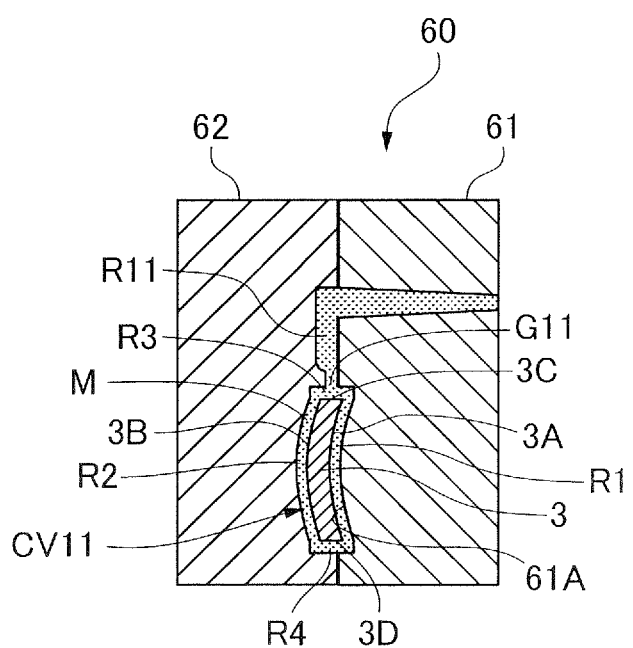
FIG. 11B is a diagram for describing the process of forming the resin portions of the first exemplary embodiment.

FIGS. 11A and 11B are diagrams for describing a step of forming the resin portions of the first exemplary embodiment. FIG. 11A is a schematic view of the mold 60, and FIG. 11B is a section view of the mold 60 taken along a line XIB of FIG. 11A. As illustrated in FIGS. 11A and 11B, molten resin M is injected into the cavities CV11, CV12, CV21, and CV22.

After injecting the molten resin M into the cavities CV11, CV12, CV21, and CV22, the pressure in the cavities CV11, CV12, CV21, and CV22 is kept at a predetermined value for a predetermined period by the molten resin M in step S113 of FIG. 8B. Then, the molten resin M in the mold 60 is cooled in step S114 of FIG. 8B to solidify the molten resin M. Then, the mold 60 is opened in step S115 of FIG. 8B to take out a molded product from the mold 60.

By the insert molding method described above, the resin portions 211, 213, 221, and 223 illustrated in FIG. 1 serving as bases for reflection portions are formed on the front surface side of the metal frame 3, and the resin portions 311, 313, 321, and 323 illustrated in FIG. 1 are formed on the back surface side of the metal frame 3. In this manner, the resin portions can be easily formed by insert molding.

To be noted, although a resin channel from the one sprue S toward an optical element is provided in the arrangement of the runners illustrated in FIG. 9A, a so-called multiple production molding may be performed by further branching the runners from one sprue to cause resin to flow into a plurality of optical elements.

Figure 12A:
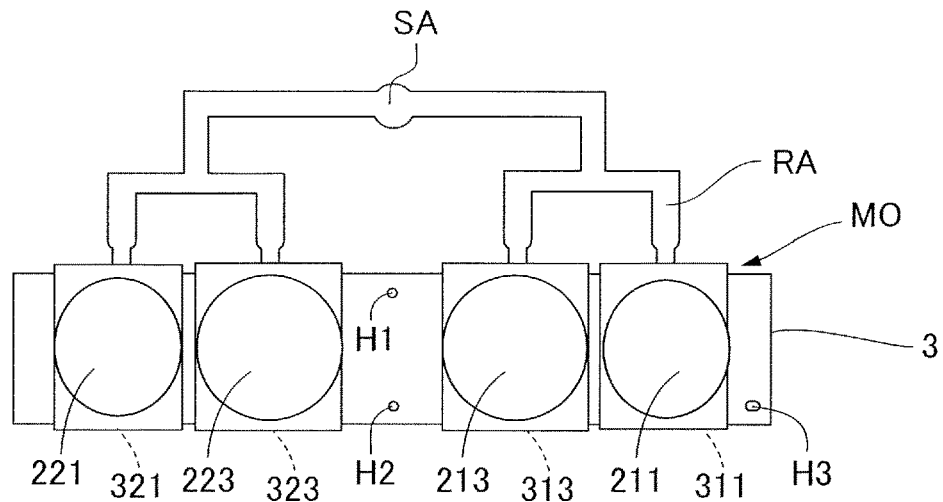
FIG. 12A is a diagram for describing a molded product of the first exemplary embodiment.
Figure 12B:
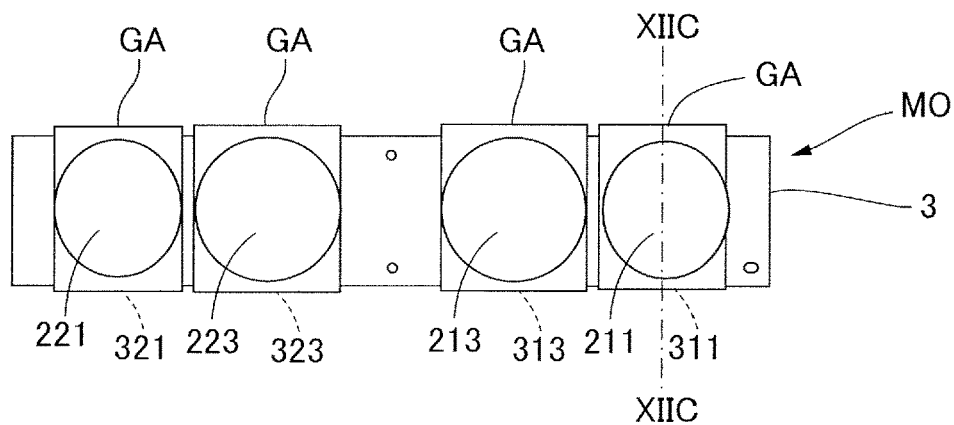
FIG. 12B is a diagram for describing the molded product of the first exemplary embodiment.
Figure 12C:
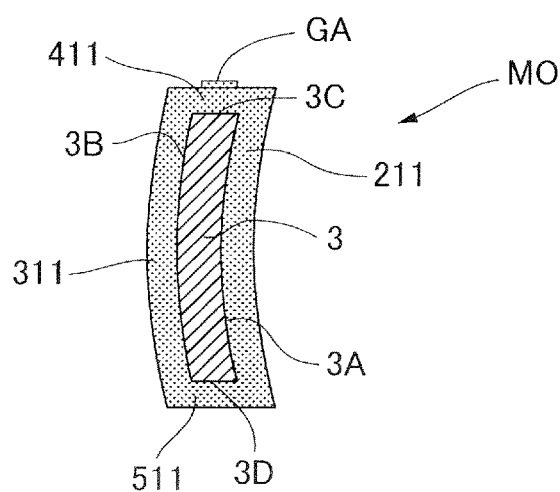
FIG. 12C is a diagram for describing the molded product of the first exemplary embodiment.

FIGS. 12A, 12B, and 12C are diagrams for describing a molded product of the first exemplary embodiment. FIG. 12A is a front view of the molded product taken out from the mold 60. A molded product MO that is an intermediate product illustrated in FIG. 12A is formed by forming the resin portions 211, 213, 221, 223, 311, 313, 321, and 323 on the metal frame 3. Sprue resin SA and runner resin RA are connected to the molded product MO. These need to be removed from the molded product MO. Therefore, these are cut off at a position corresponding to a gate by an unillustrated cutting machine in step S116 of FIG. 8B.

FIG. 12B is a front view of the molded product MO. After the runner resin RA is removed from the molded product MO at the position corresponding to the gate, a gate trace GA is left on the molded product MO. Description will be given in detail by taking the resin portions 211 and 311 as an example. FIG. 12C is a section view of the molded product MO taken along a line XIIC of FIG. 12B. As illustrated in FIG. 12C, the resin portion 211 is formed on the main surface 3A of the metal frame 3, and the resin portion 311 is formed on the main surface 3B. The resin portions 211 and 311 are formed so as to oppose each other with the metal frame 3 therebetween.

On the end portion 3C of the metal frame 3, a resin portion 411 serving as a third resin portion interconnecting the resin portions 211 and 311 is formed at a position corresponding to the channel R3 of FIG. 11B. The gate trace GA is formed on the resin portion 411.

On the end portion 3D of the metal frame 3 opposite to the end portion 3C, a resin portion 511 serving as a fourth resin portion interconnecting the resin portions 211 and 311 is formed at a position corresponding to the channel R4 of FIG. 11B. These resin portions 211, 311, 411, and 511 are integrally formed so as to cover the metal frame 3. As a result of this, the resin portions 211 and 311 are difficult to peel off from the metal frame 3. Therefore, the shape precision of the reflection surface of the reflection portion 111 can be kept high. In addition, even in the case where one or both of the resin portions 211 and 311 are peeled off from the metal frame 3, the resin portions 211 and/or the resin portion 311 that has been peeled off from the metal frame 3 can be prevented from dropping. In the present exemplary embodiment, one of the resin portions 411 and 511 is positioned above the metal frame 3 and the other is positioned below the metal frame 3, and thus dropping of the resin portions 211 and 311 is effectively prevented.

To be noted, although it is preferable that the resin portion 511 is provided, the resin portion 511 may be omitted. That is, the end portion 3D of the metal frame 3 may be exposed to the outside. In this case, for example, even in the case where the resin portion 211 is peeled off from the metal frame 3, the resin portion 211 that has been peeled off is supported by the resin portion 311 via the resin portion 411. The same applies to the case where the resin portion 311 is peeled off instead. In this case, it is preferable that the optical element 13 is disposed such that the end portion 3D exposed to the outside is directed downward. That is, in this case, the resin portion 411 is disposed on the upper end portion of the metal frame 3. In this case, even when both of the resin portions 211 and 311 are peeled off from the metal frame 3, the resin portion 411 is caught by or adheres to the upper end portion of the metal frame 3, and thus dropping of the resin portions 211 and 311 can be prevented.

Next, step S102 serving as a second formation step illustrated in FIG. 8A will be described in detail. The reflection portions 111, 113, 121, and 123 constituted by reflective films are formed on the resin portions 211, 213, 221, and 223 formed on the metal frame 3 in step S101. Various film formation methods, for example, typical methods that are widely used such as a vapor deposition method and a sputtering method, can be used for formation of the reflective films. Metal having high reflectance such as aluminum or silver may be used as the material for the reflective films, and it is preferable that the material reflects 90% or more of light in a wavelength range of 400 nm to 800 nm. Further, the reflective films may be formed as multilayer films by adding dielectric films and the like for protecting the surface or improving the reflectance.

Figure 13:
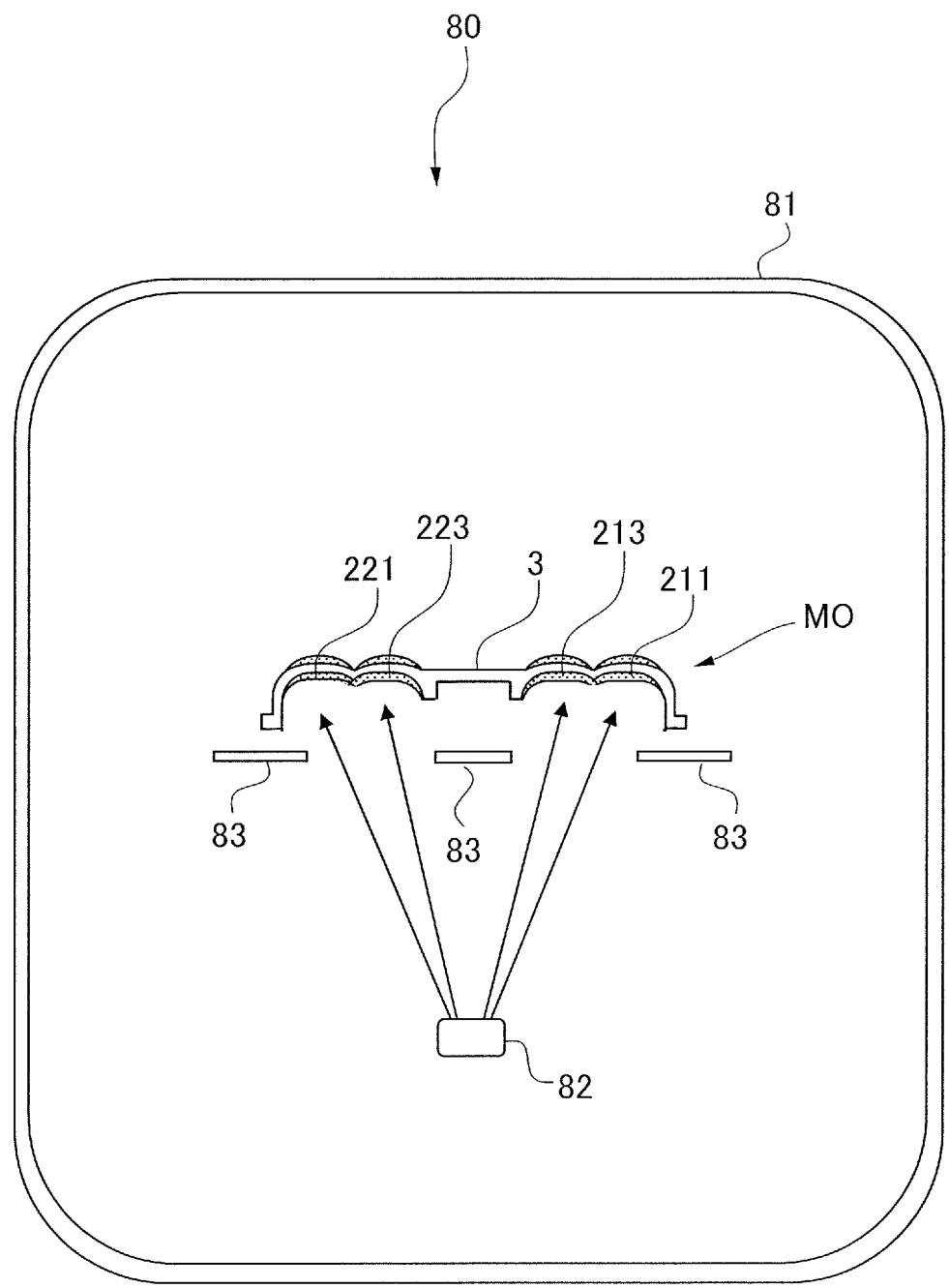
FIG. 13 is a diagram for describing a process of forming a reflection portion of the first exemplary embodiment.

FIG. 13 is a diagram for describing a step for forming the reflection portions of the first exemplary embodiment. Specifically, FIG. 13 is a schematic diagram illustrating an example of forming the reflective films by a vacuum vapor deposition method on the resin portions 211, 213, 221, and 223 formed on the metal frame 3. FIG. 13 schematically illustrates a vacuum vapor deposition apparatus 80. The vacuum vapor deposition apparatus 80 includes a vacuum chamber 81, a vapor deposition source 82, and a vapor deposition mask 83. The metal frame 3 is set at a predetermined position in the vacuum chamber 81, and the inside of the vacuum chamber 81 is depressurized to vacuum of a predetermined degree by an unillustrated vacuum pump. The predetermined position is a position at which the resin portions 211, 213, 221, and 223 are visible from the vapor deposition source 82. The vapor deposition mask 83 is disposed in the vacuum chamber 81 such that the reflective films are not formed on the surface of the metal frame 3 except for on the resin portions 211, 213, 221, and 223. Reflective film precursor evaporated from the vapor deposition source 82 is deposited on the free-form surfaces of the resin portions 211, 213, 221, and 223, and thus the reflective films are formed. Since the reflection portions 111, 113, 121, and 123 are disposed on one side of the metal frame 3, the reflection portions constituted by reflective films can be formed by a single vapor deposition process. In the present exemplary embodiment, in step S102 of FIG. 8A, one reflection portion is formed on each of the resin portions 211, 213, 221, and 223. The reflective films on the metal frame 2 and the metal support bases 4 and 5 can be manufactured in a similar manner.

To be noted, mass-productivity may be improved by configuring the vacuum vapor deposition apparatus such that a plurality of metal frames and support bases can be set therein to form reflective films on a plurality of members by a single process of vapor deposition. The same applies to other film formation techniques such as a sputtering method.

Since one reflection portion is formed on one resin portion, in resin channels constituted by the gates G11, G12, G21, and G22 and the runners R11, R12, R21, and R22, one gate and one runner are provided for each one reflection portion as illustrated in FIG. 9A. As a result of this, molding with higher precision can be performed by finely adjusting the runner diameter and gate dimensions for each resin portion when adjusting a flow balance or pressure balance for injection molding of the resin portions 211, 213, 221, and 223.

Example 1 and Comparative Example 1

Next, Example 1 corresponding to the first exemplary embodiment will be described.

As the metal frame 3 illustrated in FIG. 1, a metal plate having a length of 200 mm, a width of 40 mm, and a thickness of 2 mm and formed from a magnesium alloy was manufactured by a thixomolding method. The metal plate was formed in a shape warped overall in accordance with the optical arrangement of the reflection portions 111, 113, 121, and 123. In addition, the surface of the metal plate was processed into spherical shapes in accordance with the shapes of the reflection surfaces at positions corresponding to the four reflection portions 111, 113, 121, and 123. Specifically, surface of the metal plate at each position corresponding to each reflection portion was processed into a concave surface that has a spherical shape of a radius of 30 mm, which is the same shape as an optically designed shape of the reflection surface.

This metal plate was inserted in the mold 60 illustrated in FIGS. 9A and 9B, and injection molding was performed such that a 1 mm thick layer of polyolefin-based resin is formed on both sides of the metal plate. In this example, ZEONEX (registered trademark) E48R manufactured by Zeon corporation was used as the polyolefin-based resin. The molded product MO illustrated in FIG. 12A was taken out from the mold, and the sprue resin SA and the runner resin RA that were unnecessary for the product were cut off at a portion corresponding to a gate. Then, aluminum films used as mirrors were laminated on the surfaces of the resin portions 211, 213, 221, and 223 by vapor deposition, and thus the optical element 13 was obtained.

In addition, as Comparative Example 1, an optical element in which the resin portions and the aluminum films were formed on only one side of the metal plate, that is, only on the reflection surface side of the metal plate was manufactured by the same method as Example 1.

An evaluation method for the optical elements manufactured in Example 1 and Comparative Example 1 will be described. For the optical elements, use in an environment with drastic change in temperature such as a car-mounted camera is expected. Therefore, the shapes of the optical elements were evaluated in a state in which the optical elements were exposed to environments of temperatures from extremely low temperature to high temperature. Specifically, the radius of curvature of each reflection surface was measured, and how the radius of curvature changed in a low-temperature environment, a normal-temperature environment, and a high-temperature environment was evaluated. The temperature of the low-temperature environment was −20° C., the temperature of the normal-temperature environment was 23° C., and the temperature of the high-temperature environment was 80° C. The radius of curvature was measured by using a Fizeau interferometer of Verifire manufactured by Zygo Corporation.

Amounts of deviation from a designed value of the radius of curvature, which is 30 mm, are shown in Table 1 as results of the measurement. An allowable range of the amount of deviation of the radius of curvature with respect to the designed value of the radius of curvature is, for example, ±20 μm. This allowable range may be determined in accordance with a precision required for an image.

TABLE 1

Amount of Deviation of Radius of Curvature in Example 1 and Comparative Example 1

| | Temperature of measurement environment | | |
|---|---|---|---|
| | −20° C. | 23° C. | 80° C. |
| Example 1 | −6 μm | +4 μm | +15 μm |
| Comparative Example 1 | −46 μm | −10 μm | +80 μm |

In results of Example 1 of Table 1, whereas the amount of deviation in the normal-temperature environment was +4 μm, the amount of deviation was −6 μm in the low-temperature environment and was +15 μm in the high-temperature environment. The cause of the deviation of the radius of curvature being smaller in the low-temperature environment than in the normal-temperature environment and larger in the high-temperature environment than in the normal-temperature environment is presumed to be overall shrinkage or expansion of the element caused by temperature change. However, the amount of deviation of the radius of curvature is within the allowable range in all of the low-temperature, normal-temperature, and high-temperature environments. Therefore, the imaging performance of the camera was maintained, and an image of a good quality was obtained.

In contrast, in results of Comparative Example 1 of Table 1, in the normal-temperature environment, the amount of deviation was −10 μm, which was within the allowable range, and the imaging performance was maintained. However, in the low-temperature and high-temperature environments, the radius of curvature was deviated beyond the allowable range. This is presumed to be because a force to deform the element was generated due to difference in linear expansion rate as a result of laminating the resin portions only on one side of the element, which was a mirror surface side, in addition to the overall shrinkage or expansion of the element that also occurred in Example 1. Since the resin portions shrink more than the substrate, which is the metal plate, a force to warp the entirety of the element to the resin portion side is generated. It is considered that the radius of curvature of Comparative Example 1 became smaller in the low-temperature environment as a result of this. In addition, in the high-temperature environment, since the resin portions expand more than the substrate, a force to warp the entirety of the element to the opposite side to the resin portions is generated. It is considered that the radius of curvature of Comparative Example 1 became larger in the high-temperature environment as a result of this. The amount of deviation of the radius of curvature was out of the allowable range in the low-temperature and high-temperature environments.

Second Exemplary Embodiment

Figure 14A:
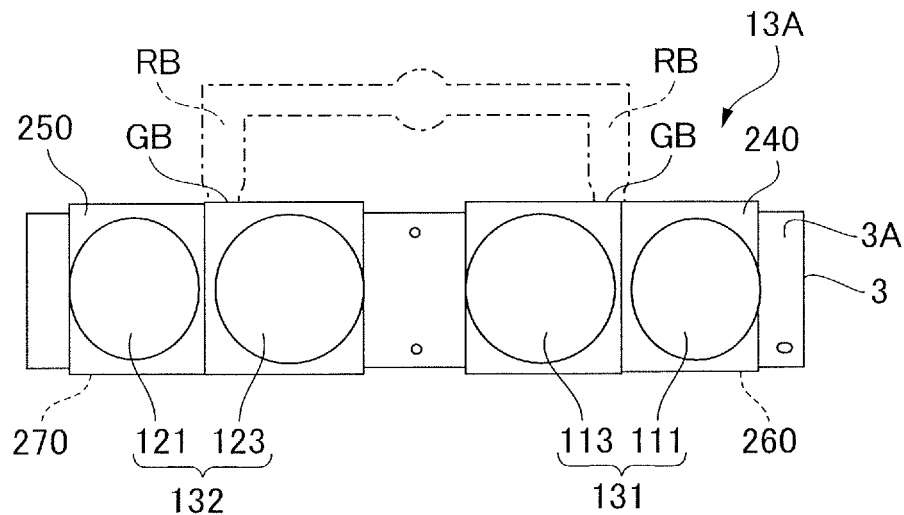
FIG. 14A is a front view of an optical element of a second exemplary embodiment.

Next, a manufacturing method for an optical element according to a second exemplary embodiment and the optical element manufactured by the manufacturing method will be described. FIG. 14A is a front view of the optical element according to the second exemplary embodiment. In the second exemplary embodiment, a case where an optical element 13A illustrated in FIG. 14A is used instead of the optical element 13 among the optical elements 12 to 15 illustrated in FIG. 1 will be described as an example.

One first resin portion may be formed as a common base for a plurality of reflection portions. In the second exemplary embodiment, as illustrated in FIG. 14A, the optical element 13A includes the metal frame 3 and resin portions 240 and 250 serving as a plurality of first resin portions provided on the main surface 3A of the metal frame 3.

The reflection portion group 131 constituted by the plurality of reflection portions 111 and 113 is formed on the resin portion 240 that is one first resin portion, and the reflection portion group 132 constituted by the plurality of reflection portions 121 and 123 is formed on the resin portion 250 that is one first resin portion.

On the metal frame 3, a resin portion 260 serving as a second resin portion is disposed opposite to the resin portion 240, and a resin portion 270 serving as a second resin portion is disposed opposite to the resin portion 250. As a result of this, similarly to the first exemplary embodiment, deformation of the optical element 13A caused by change in the temperature of the environment in which the optical element 13A is put can be suppressed, and thus the shape precision of the reflection portions 111, 113, 121, and 123 can be kept high.

Figure 14B:
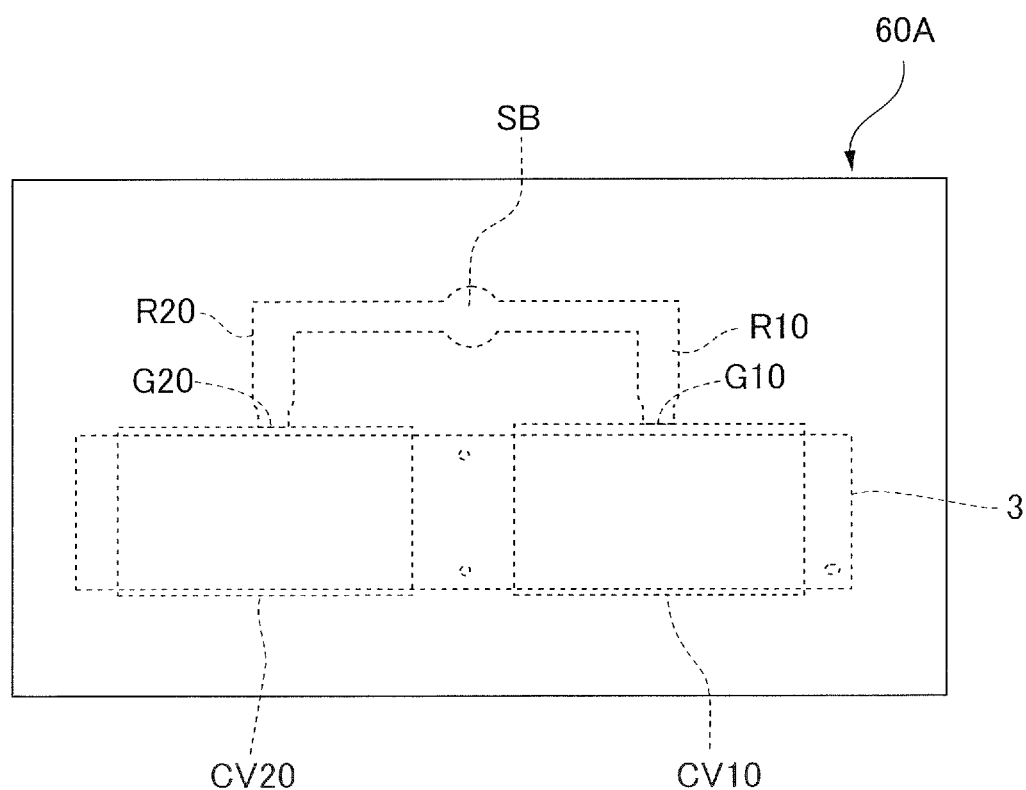
FIG. 14B is a diagram for describing a process of forming resin portions of the second exemplary embodiment.

A manufacturing method for the optical element 13A will be described. FIG. 14B is a diagram for describing a step for forming the resin portions of the second exemplary embodiment. FIG. 14B is an explanatory diagram illustrating a state in which the metal frame 3 is inserted in a mold 60A. As illustrated in FIG. 14B, in step S111 of FIG. 8B serving as an insertion step, the metal frame 3 is inserted in the mold 60A. By clamping the mold 60A, cavities CV10 and CV20 are defined inside the mold 60A. In the mold 60A, the metal frame 3 is disposed to be present in both of the cavities CV10 and CV20.

The cavity CV10 is a space for forming the resin portion 240 illustrated in FIG. 14A and the resin portion 260 serving as a second resin portion opposite to the resin portion 240. The cavity CV20 is a space for forming the resin portion 250 illustrated in FIG. 14A and the resin portion 270 serving as a second resin portion opposite to the resin portion 250.

In the mold 60A, a channel for molten resin constituted by a sprue SB, runners R10 and R20, and gates G10 and G20 and communicating with the cavities CV10 and CV20 is defined. One gate is provided for each of the cavities CV10 and CV20.

In step S112 of FIG. 8B, molten resin is supplied to the cavities CV10 and CV20 through the sprue SB and respectively through the runners R10 and R20 and the gates G10 and G20. Then, in step S113 of FIG. 8B, the pressure is maintained in a state in which the cavities CV10 and CV20 are filled with the molten resin, and the molten resin is cooled to solidify in step S114 of FIG. 8B.

Then, in step S115 of FIG. 8B, the mold 60A is opened, and a molded product is taken out from the mold 60A. In step S116 of FIG. 8B, runner resin RB corresponding to the runners R10 and R20 is removed from the optical element 13A by cutting. To be noted, in FIG. 14A, the runner resin RB is indicated by one-dot chain lines. As a result of this cutting, gate traces GB are left on the optical element 13A. In step S102 of FIG. 8A, films of the reflection portion groups 131 and 132 are respectively formed on the resin portions 240 and 250. As a result of the optical element 13A including a pair of reflection portion groups, stereo imaging can be performed.

In the second exemplary embodiment, in step S102, the resin portion 240 serving as a common base for the reflection portion group 131 is formed in the one cavity CV10. Similarly, the resin portion 250 serving as a common base for the reflection portion group 132 is formed in the one cavity CV20. As a result of this, in the case where an interval between the reflection portions 111 and 113 is small and an interval between the reflection portions 121 and 123 is small, a cavity partitioned by a thin portion does not have to be provided for each reflection portion, and thus strength of the mold 60A can be secured.

In the second exemplary embodiment, since a plurality of reflection portions are formed on one resin portion, the number of gates and runners in the mold 60A can be reduced. Therefore, the mold 60A can be manufactured more easily.

Example 2 and Comparative Example 2

Next, Example 2 corresponding to the second exemplary embodiment will be described.

As the metal frame 3 illustrated in FIG. 14A, a metal plate having a length of 200 mm, a width of 40 mm, and a thickness of 2 mm and formed from an aluminum alloy was manufactured by a die casting method. A polycarbonate-based resin was used as the resin used for the resin portions. In the present example, Panlite (registered trademark) manufactured by TEIJIN LIMITED was used as the polycarbonate-based resin. The reflection portions 111, 113, 121, and 123 were formed by depositing silver on the surfaces of the resin portions 240 and 250 by vapor deposition, and thus the optical element 13A was obtained.

As Comparative Example 2, an optical element in which the resin portions and the silver thin films were formed on only one side of the metal plate, that is, only on the reflection surface side of the metal plate was manufactured by the same method as Example 2.

An evaluation method for the optical elements manufactured in Example 2 and Comparative Example 2 will be described. For the optical elements, use in an environment with drastic change in temperature such as a car-mounted camera is expected. Therefore, the shapes of the optical elements were evaluated in a state in which the optical elements were exposed to environments of temperatures from extremely low temperature to high temperature. Specifically, the radius of curvature of each reflection surface was measured, and how the radius of curvature changed in a low-temperature environment, a normal-temperature environment, and a high-temperature environment was evaluated. The temperature of the low-temperature environment was −20° C., the temperature of the normal-temperature environment was 23° C., and the temperature of the high-temperature environment was 80° C. The radius of curvature was measured by using a Fizeau interferometer of Verifire manufactured by Zygo Corporation.

Amounts of deviation from a designed value of the radius of curvature, which is 30 mm, are shown in Table 2 as results of the measurement. An allowable range of the amount of deviation of the radius of curvature with respect to the designed value of the radius of curvature is, for example, ±20 μm. This allowable range may be determined in accordance with a required precision of the image.

TABLE 2

Amount of Deviation of Radius of Curvature in Example 2 and Comparative Example 2

| | Temperature of measurement environment | | |
|---|---|---|---|
| | −20° C. | 23° C. | 80° C. |
| Example 2 | −10 μm | +7 μm | +19 μm |
| Comparative Example 2 | −53 μm | −12 μm | +93 μm |

In results of Example 2 of Table 2, whereas the amount of deviation in the normal-temperature environment was +7 the amount of deviation was −10 μm in the low-temperature environment and was +19 μm in the high-temperature environment. The cause of the deviation of the radius of curvature being smaller in the low-temperature environment than in the normal-temperature environment and larger in the high-temperature environment than in the normal-temperature environment is presumed to be overall shrinkage or expansion of the element caused by temperature change. However, the amount of deviation of the radius of curvature is within the allowable range in all of the low-temperature, normal-temperature, and high-temperature environments. Therefore, the imaging performance of the camera was maintained, and thus an image of a good quality was obtained.

In contrast, in results of Comparative Example 2 of Table 2, in the normal-temperature environment, the amount of deviation was −12 μm, which was within the allowable range, and the imaging performance was maintained. However, the amount of deviation of the radius of curvature was out of the allowable range in the low-temperature and high-temperature environments.

In Example 2, the amounts of deviation are overall larger than in Example 1. The cause of this is presumed to be that, in Example 2, since two reflection portions were formed on one resin portion, the resin portions became larger than in Example 1, and thus the amount of deformation in expansion and shrinkage became larger than in Example 1.

To be noted, the present invention is not limited to the exemplary embodiments described above, and can be modified in many ways within the technical concept of the present invention. In addition, effects described in the exemplary embodiments are just examples of most preferable effects that can be achieved by the present invention, and effects of the present invention are not limited to the examples described in the exemplary embodiments.

Although a case where the substrates are formed from metal has been described in the exemplary embodiments described above, the substrates may be formed from other materials than metal, for example, resin, ceramics, or the like, as long as the linear expansion coefficient of the substrates is smaller than the linear expansion coefficients of the first resin portions and the second resin portions.

In addition, although a case where the resin portions are provided directly on the surfaces of the substrates has been described in the exemplary embodiments described above, the configuration is not limited to this. For example, members such as films may be provided on the surfaces of the substrates. In this case, the resin portions are provided on the surfaces of the substrates with the members such as films therebetween. Examples of the films include antioxidation films, coating films, and metal films. In addition, these films may be either of single-layer films and multi-layer films.

In addition, although a case where the reflection surface of each reflection portion is a concave surface has been described in the exemplary embodiments described above, the configuration is not limited to this. For example, the reflection surface may be a convex surface or a flat surface.

In addition, although a case where one gate is provided for one cavity has been described in the exemplary embodiments described above, the configuration is not limited to this. A plurality of gates may be provided for one cavity. In this case, it is preferable that a weld line is not formed in a portion corresponding to a reflection portion.

In addition, although a case where the image pickup apparatus is a stereo camera apparatus, which is a preferable example of the image pickup apparatus, has been described in the exemplary embodiments described above, the configuration is not limited to this. For example, the image pickup apparatus may be a monocular camera apparatus. In the case of a monocular camera apparatus, providing only one of the imaging optical systems described in the exemplary embodiments described above is enough. In the case of performing stereo imaging by the monocular camera apparatus, a plurality of monocular camera apparatuses may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-071410, filed Apr. 3, 2018, which is hereby incorporated by reference herein in its entirety.

What is claimed is:

1. An optical element comprising:
a substrate comprising a front surface and a back surface opposite to the front surface;
a first resin portion provided on the front surface of the substrate and having a linear expansion coefficient larger than a linear expansion coefficient of the substrate;
a reflection portion provided on the first resin portion; and
a second resin portion provided on the back surface of the substrate and having a linear expansion coefficient larger than the linear expansion coefficient of the substrate, wherein the substrate comprises a first end portion interconnecting the front surface and the back surface, and wherein a third resin portion is provided on the first end portion and interconnects the first resin portion and the second resin portion.

2. The optical element according to claim 1, wherein the second resin portion contains a same resin as the first resin portion.

3. The optical element according to claim 1, wherein a gate trace is formed on the third resin portion.

4. The optical element according to claim 1, wherein the substrate comprises a second end portion interconnecting the front surface and the back surface and disposed on a side opposite to the first end portion, wherein a fourth resin portion is provided on the second end portion and interconnects the first resin portion and the second resin portion.

5. The optical element according to claim 1, wherein the first resin portion is one of a plurality of first resin portions provided on the front surface, and wherein the reflection portion is one of a plurality of reflection portions provided on the plurality of first resin portions.

6. The optical element according to claim 1, wherein the reflection portion is one of a plurality of reflection portions provided on the first resin portion.

7. The optical element according to claim 1, wherein a value obtained by subtracting a thickness of the second resin portion from a thickness of the first resin portion is −0.2 mm to +0.2 mm.

8. The optical element according to claim 1, wherein the substrate is formed from a metal, and wherein a resin contained in the first resin portion and a resin contained in the second resin portion are amorphous resins.

9. The optical element according to claim 1, wherein the substrate, the first resin portion, the reflection portion, and the second resin portion are layered in an order of the second resin portion, the substrate, the first resin portion, and the reflection portion.

10. An image pickup apparatus comprising:
the optical element according to claim 1; and
an image pickup element.

11. A stereo camera apparatus comprising:
a stereo-image pickup optical system comprising the optical element according to claim 1; and
an image pickup element.

12. A manufacturing method for an optical element, the manufacturing method comprising:

providing a substrate comprising a front surface and a back surface opposite to the front surface;

inserting the substrate in a mold and injecting a molten resin into the mold to form a first resin portion on the front surface of the substrate and a second resin portion on the back surface of the substrate, the first resin portion having a linear expansion coefficient larger than a linear expansion coefficient of the substrate, and second resin portion having a linear expansion coefficient larger than the linear expansion coefficient of the substrate; and forming a reflection portion on the first resin portion.

13. The manufacturing method according to claim 12, wherein the substrate is inserted in the mold such that a first channel of the molten resin through which a first space on a side of the front surface and a second space on a side of the back surface communicate with each other is defined between the mold and an end portion of the substrate.

14. The manufacturing method according to claim 13, wherein the first channel is connected to a gate.

15. The manufacturing method according to claim 13, wherein the substrate is inserted in the mold such that a second channel through which the first space and the second space communicate with each other is defined between the mold and an end portion of the substrate opposite to the end portion defining the first channel together with the mold.

16. The manufacturing method according to claim 12, wherein the first resin portion is one of a plurality of first resin portions, the second resin portion is one of a plurality of second resin portions, and the reflection portion is one of a plurality of reflection portions, wherein the substrate is disposed to be present in a plurality of cavities defined in the mold, and the plurality of first resin portions and the plurality of second resin portions are formed by injecting the molten resin respectively into the plurality of cavities, and wherein the plurality of reflection portions are formed on the plurality of first resin portions.

17. The manufacturing method according to claim 12, wherein the reflection portion is one of a plurality of reflection portions, and the plurality of reflection portions are formed on the first resin portion.

18. The manufacturing method according to claim 12, wherein the substrate, the first resin portion, the reflection portion, and the second resin portion are layered in an order of the second resin portion, the substrate, the first resin portion, and the reflection portion.

* * * * *